United States Patent
Okabe et al.

(10) Patent No.: US 12,252,643 B2
(45) Date of Patent: Mar. 18, 2025

(54) LIQUID CRYSTAL COMPOSITION, ELEMENT AND LIQUID CRYSTAL LENS OR A BIREFRINGENT LENS FOR STEREOSCOPIC IMAGE DISPLAY

(71) Applicants: JNC CORPORATION, Tokyo (JP); JNC PETROCHEMICAL CORPORATION, Tokyo (JP)

(72) Inventors: Eiji Okabe, Chiba (JP); Takanori Mori, Chiba (JP); Kazushi Shiren, Chiba (JP); Yuko Katano, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 0 days.

(21) Appl. No.: 18/515,161

(22) Filed: Nov. 20, 2023

(65) Prior Publication Data
US 2024/0294830 A1    Sep. 5, 2024

(30) Foreign Application Priority Data

Feb. 9, 2023  (JP) .................. 2023-018624
Nov. 6, 2023  (JP) .................. 2023-189272

(51) Int. Cl.
*G02F 1/1333*  (2006.01)
*C09K 19/30*  (2006.01)
*C09K 19/44*  (2006.01)

(52) U.S. Cl.
CPC .......... *C09K 19/44* (2013.01); *C09K 19/3003* (2013.01); *C09K 19/3059* (2013.01); *C09K 2019/3016* (2013.01); *C09K 2019/306* (2013.01)

(58) Field of Classification Search
CPC ............... C09K 19/44; C09K 19/3003; C09K 19/3098; C09K 19/3491; C09K 2019/3016; C09K 2019/123; G02F 1/1333
See application file for complete search history.

(56) References Cited

U.S. PATENT DOCUMENTS 11,739,265 B2 * 8/2023  Brocke .............. C09K 19/3048
                                                      252/299.61
2012/0205583 A1   8/2012  Montenegro et al.
2020/0328528 A1  10/2020  Misaki et al.
2023/0235228 A1 * 7/2023  Li ..................... C09K 19/04
                                                      252/299.63
2024/0294830 A1 * 9/2024  Okabe ................ C09K 19/3003

FOREIGN PATENT DOCUMENTS

| JP | 2004285085 | 10/2004 | | |
|---|---|---|---|---|
| JP | 2011074074 | 4/2011 | | |
| WO | 2017201515 | 11/2017 | | |
| WO | 2017208996 | 12/2017 | | |
| WO | WO-2021116080 A1 * | 6/2021 | ............. | C09K 19/04 |
| WO | WO-2022090098 A1 * | 5/2022 | ........... | C07C 331/28 |

OTHER PUBLICATIONS

Hiroshi Moritake, "Microwave / millimeter wave phase control device (1st) Microwave characteristics of liquid crystal display," Ekisho, vol. 23, Jan. 2019, with partial English translation thereof, pp. 1-7.

Yoshio Inuishi, "Dielectric Phenomenon Theory," Institute of Electrical Engineers of Japan, Ohmsha, Ltd., Jul. 1973, with partial English translation thereof, pp. 1-9.

* cited by examiner

*Primary Examiner* — Geraldina Visconti
(74) *Attorney, Agent, or Firm* — JCIPRNET

(57) ABSTRACT

A liquid crystal composition as a material used for elements for controlling electromagnetic wave signals in a frequency range of 1 GHz to 10 THz, and an element containing this composition are provided. In the liquid crystal composition, a characteristic balance is excellent, and at least one of characteristics of a wide temperature range of a nematic phase, a large refractive index anisotropy in a frequency region used for control, and a small dielectric loss tangent (tan δ) is satisfied. A liquid crystal composition containing at least one compound selected from compounds represented by Formula (1) is provided:

(1)

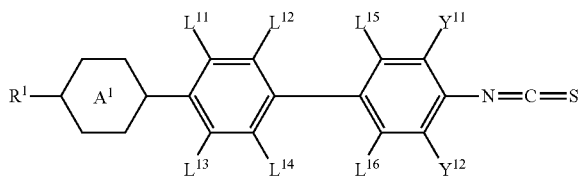

wherein $R^1$ is an alkyl having 1 to 12 carbon atoms; ring $A^1$ is 1,4-phenylene; $L^{11}$, $L^{13}$, $L^{14}$, $L^{16}$, $Y^{11}$, and $Y^{12}$ are each hydrogen; $L^{12}$ is fluorine; and $L^{15}$ is methyl.

18 Claims, No Drawings

LIQUID CRYSTAL COMPOSITION, ELEMENT AND LIQUID CRYSTAL LENS OR A BIREFRINGENT LENS FOR STEREOSCOPIC IMAGE DISPLAY

CROSS-REFERENCE TO RELATED APPLICATION

This application claims the priority benefit of Japan Application No. 2023-018624, filed on Feb. 9, 2023 and Japan Application No. 2023-189272, filed on Nov. 6, 2023. The entirety of the above-mentioned patent application is hereby incorporated by reference herein and made a part of this specification.

BACKGROUND

Technical Field

The present disclosure relates to a liquid crystal composition having a nematic phase and a positive dielectric constant anisotropy, and an element containing the same. In particular, the present disclosure relates to a liquid crystal composition used for controlling electromagnetic waves in a frequency range of 1 GHz to 10 THz, and an element containing the same.

Description of Related Art

As a new usage for liquid crystal compositions which are often used in a display usage, attention is being paid to their applications to a high-frequency technology such as antennas that transmit and receive electromagnetic waves using liquid crystal compositions.

Specific examples of elements used for electromagnetic wave control in a frequency range of 1 GHz to 10 THz include millimeter-wave band or microwave band antennas, and infrared laser elements. Various types of these elements have been studied, but a type using a liquid crystal composition is attracting attention because this type is thought to generate fewer defects because it does not use mechanical movable parts.

In a liquid crystal composition having dielectric constant anisotropy, the dielectric constants in a perpendicular direction and a horizontal direction with respect to the orientation direction of the liquid crystal composition are different at frequencies (about several 10 kHz to several 100 MHz or less) which are lower than a frequency (relaxation frequency) at which orientation polarization is relaxed. Even at frequencies higher than the relaxation frequency, that is, in a range from microwaves to terahertz waves (approximately 10 THz), although a value is smaller, there is a difference in dielectric constant in a perpendicular direction and a horizontal direction with respect to the orientation direction of the liquid crystal composition, meaning that there is dielectric constant anisotropy (Non-Patent Document 1). Therefore, the dielectric constant in one direction in the liquid crystal composition can be changed by the orientation direction of molecules changing in response to an external field (electric field).

By utilizing this property, the liquid crystal composition can change the dielectric constant by changing the orientation of molecules in response to an external electric field. For example, it is possible to realize a microwave device that can electrically control transmission characteristics of a high-frequency transmission line from the outside. As such devices, a voltage-controlled millimeter-wave variable phase shifter in which a waveguide is filled with a nematic liquid crystal composition, a microwave-millimeter-wave wideband variable phase shifter using a nematic liquid crystal composition as a dielectric substrate for microstrip lines, and the like have been reported (Patent Documents 1 and 2).

In addition, in recent years, research has been progressing on metamaterial technology that exhibits a behavior that does not exist in natural substances with respect to electromagnetic waves including light. Based on its characteristics, it has been applied to technical fields such as high-frequency devices, microwave devices, and antennas, and various electromagnetic wave control elements have been devised. As a capacitance control material for transmission lines using metamaterials, the use of a liquid crystal composition that can change the dielectric constant by changing the orientation of molecules in response to an external electric field is also being considered.

It is desirable that an element used for such electromagnetic wave control have characteristics such as high gain and low loss. When considering phase control of high-frequency signals, a liquid crystal composition is required to have the following characteristics: a dielectric constant anisotropy that enables large phase control is large in a frequency region used for phase control; and a dielectric loss tangent (tan δ) that is proportional to the absorbed energy of electromagnetic wave signals of the liquid crystal composition is small (Non-Patent Document 1).

Since the liquid crystal composition is a dielectric, it generates polarization (dielectric polarization) in response to an external field (electric field). A dielectric constant is a physical quantity that indicates the response of a dielectric to an electric field, and the magnitude of a dielectric constant relates to dielectric polarization. The mechanisms by which dielectric polarization occurs can be roughly divided into three: electronic polarization, ionic polarization, and orientation polarization. Orientation polarization is polarization that accompanies the orientation of the dipole moment, and as described above, it relaxes at a frequency of about several 100 kHz to several 100 MHz, and the orientation polarization becomes small. As a result, only electronic polarization and ionic polarization are involved in dielectric polarization at high frequencies (in a range from microwaves to terahertz waves (approximately 10 THz)). In a lossless dielectric, a relationship between a dielectric constant and a refractive index is $\varepsilon=n^2$, and when the ionic polarization of a liquid crystal composition is thought to be small, the larger the refractive index anisotropy ($\Delta n$) in visible light caused by electronic polarization, the greater the dielectric constant anisotropy ($\Delta \varepsilon$) in a high-frequency region is also thought to become (Non-Patent Document 2). Therefore, a liquid crystal composition preferably has a large refractive index anisotropy.

Furthermore, a low driving voltage is desirable to realize switching characteristics and high energy efficiency of the element. Therefore, a liquid crystal composition preferably has a large dielectric constant anisotropy even at low frequencies (frequencies lower than the relaxation frequency).

In addition, elements used for electromagnetic wave control are required to have a wide usable temperature range and a short response time of elements. As the characteristics of a liquid crystal composition, a high upper limit temperature of a nematic phase, a low lower limit temperature of a nematic phase, heat stability, a small viscosity, and the like are also required.

Conventional liquid crystal compositions used in the element are disclosed in Patent Documents 3 and 4 below.

Patent Documents

[Patent Document 1] PCT International Publication No. WO2017/201515
[Patent Document 2] PCT International Publication No. WO2017/208996
[Patent Document 3] Japanese Patent Laid-Open No. 2004-285085
[Patent Document 4] Japanese Patent Laid-Open No. 2011-74074

Non-Patent Documents

[Non-patent document 1] EKISHO, Volume 23 (No. 1), (2019), pp. 51-55
[Non-Patent Document 2] Dielectric Phenomena Theory, The Institute of Electrical Engineers of Japan, Ohmsha, Ltd., Jul. 25, 1973, pp. 92-95

As a material for elements used for electromagnetic wave control, a liquid crystal composition is required to have a large dielectric constant anisotropy (large refractive index anisotropy) in a frequency region for performing electromagnetic wave control, a small dielectric loss tangent (tan δ), and a large dielectric constant anisotropy at low frequencies for reducing a driving voltage while having a high upper limit temperature of a nematic phase and a low lower limit temperature of a nematic phase. More preferably, a small viscosity, a high resistivity in a driving frequency region, and heat stability are required.

However, as such a liquid crystal composition for use in elements used for electromagnetic wave control, liquid crystal compositions used for conventional display usage and the like are insufficient in terms of characteristics. This is because they are insufficient in terms of characteristics to be used for high-frequency control such as high insertion loss and/or insufficient phase shift.

The development of liquid crystal materials for elements used in electromagnetic wave control is still underway, and attempts are being made to develop novel compounds that enable optimization of such elements, in order to improve the characteristics of high-frequency control. In addition, special liquid crystal media are required for use as a material for elements used in electromagnetic wave control.

The present disclosure provides a liquid crystal composition as a material used for elements for controlling electromagnetic waves in a frequency range of 1 GHz to 10 THz, and an element containing this composition, provided that in the liquid crystal composition, the above-mentioned required characteristics are favorable, and a characteristics balance is excellent.

SUMMARY

As a result of intensive studies, the inventors of the present disclosure found that the above-mentioned objective is achieved by a liquid crystal composition containing, as a first component, at least one compound selected from the group of compounds represented by Formula (1), which are liquid crystal compounds having a specific structure, and thus completed the present disclosure.

The present disclosure includes the following embodiments.

Embodiment 1. A liquid crystal composition containing at least one compound selected from compounds represented by Formula (1).

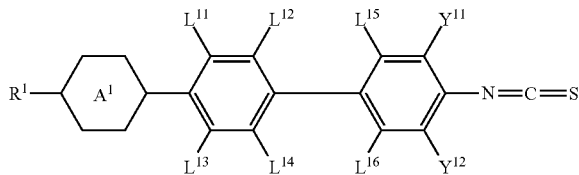

In Formula (1),

R$^1$ is hydrogen, a halogen, or an alkyl having 1 to 12 carbon atoms, provided that in this alkyl, at least one —CH$_2$— may be substituted with —O— or —S—, and at least one —(CH$_2$)$_2$— may be substituted with —CH=CH— or —C≡C—, and in these groups, at least one hydrogen may be substituted with a halogen;

ring A$^1$ is 1,4-cyclohexylene, 1,4-cyclohexenylene, 1,4-phenylene, tetrahydropyran-2,5-diyl, 1,3-dioxane-2,5-diyl, pyrimidine-2,5-diyl, 2,6,7-trioxabicyclo[2.2.2]octane-1,4-diyl, naphthalene-2,6-diyl, or pyridine-2,5-diyl, provided that at least one hydrogen on these rings may be substituted with a halogen or an alkyl having 1 to 3 carbon atoms;

L$^{11}$, L$^{12}$, L$^{13}$, L$^{14}$, L$^{15}$, and L$^{16}$ are each hydrogen, a halogen, an alkyl having 1 to 3 carbon atoms, or a cycloalkyl having 3 to 5 carbon atoms;

Y$^{11}$ and Y$^{12}$ are each hydrogen, a halogen, or an alkyl having 1 to 3 carbon atoms; and at least one of L$^{11}$, L$^{12}$, L$^{13}$, L$^{14}$, L$^{15}$, L$^{16}$, Y$^{11}$, and Y$^{12}$ is an alkyl having 1 to 3 carbon atoms.

Embodiment 2. The liquid crystal composition according to Embodiment 1, in which the at least one compound selected from the compounds represented by Formula (1) includes a compound in which at least two of L$^{11}$, L$^{12}$, L$^{13}$, L$^{14}$, L$^{15}$, Y$^{11}$, and Y$^{12}$ are not hydrogen, and at least one is an alkyl having 1 to 3 carbon atoms.

Embodiment 3. The liquid crystal composition according to Embodiment 1 or 2, in which the liquid crystal composition contains at least one compound selected from the group of compounds represented by Formulas (1-1) to (1-8) as the compound represented by Formula (1).

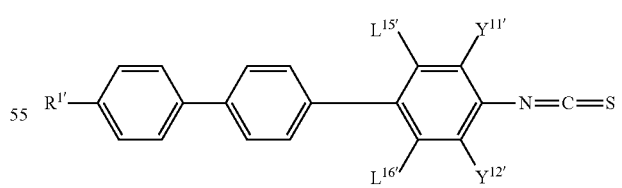

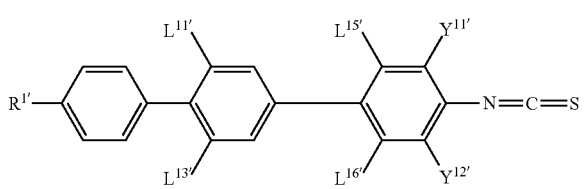

(1-3)
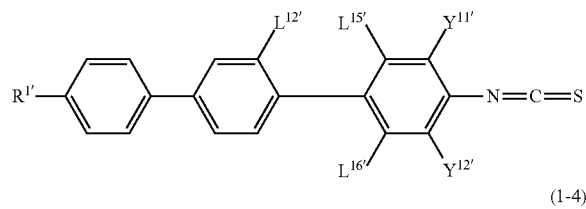

(1-4)
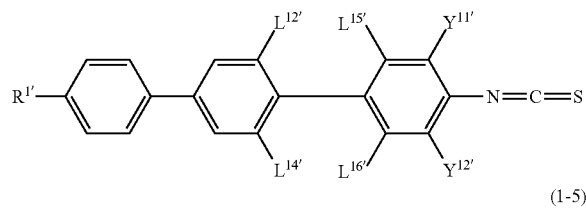

(1-5)
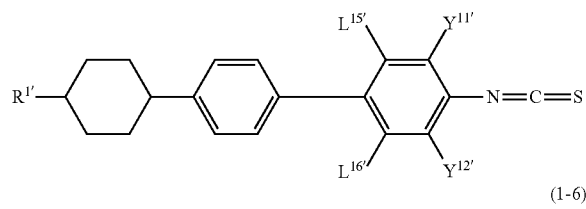

(1-6)
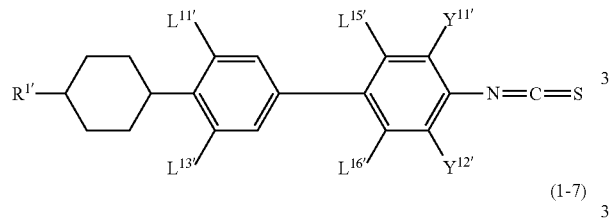

(1-7)
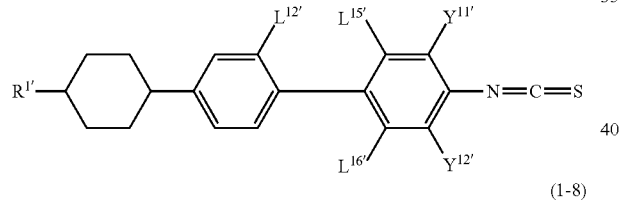

(1-8)
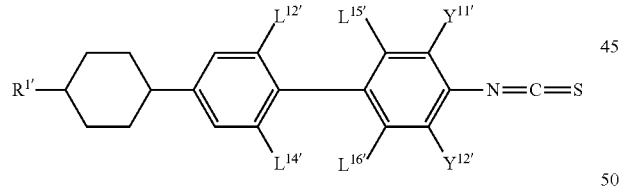

In Formulas (1-1) to (1-8),
$R^{1'}$ is an alkyl having 1 to 12 carbon atoms, provided that in this alkyl, at least one —(CH$_2$)$_2$— may be substituted with —CH=CH— or —C≡C—;
$L^{15'}$ and $L^{16'}$ are each hydrogen, fluorine, chlorine, methyl, ethyl, or cyclopropyl;
$Y^{11'}$ and $Y^{12'}$ are each hydrogen, fluorine, chlorine, methyl, or ethyl; and
at least one of $L^{15'}$, $L^{16'}$, $Y^{11'}$, and $Y^{12'}$ is methyl or ethyl,
in Formulas (1-2) and (1-6),
$L^{11'}$ and $L^{13'}$ are each fluorine, chlorine, methyl, ethyl, or cyclopropyl,
in Formulas (1-3) and (1-7),
$L^{12'}$ is fluorine, chlorine, methyl, ethyl, or cyclopropyl,
in Formulas (1-4) and (1-8),
$L^{12'}$ and $L^{14'}$ are each fluorine, chlorine, methyl, ethyl, or cyclopropyl, and
in Formulas (1-1) and (1-5),
at least two of $L^{15'}$, $L^{16'}$, $Y^{11'}$, and $Y^{12'}$ are not hydrogen.

Embodiment 4. The liquid crystal composition according to any one of Embodiments 1 to 3, in which a proportion of the compound represented by Formula (1) is in a range of 5% by weight to 40% by weight based on a weight of the liquid crystal composition.

Embodiment 5. The liquid crystal composition according to any one of Embodiments 1 to 4, the liquid crystal composition containing at least one compound selected from compounds represented by Formula (2).

(2)
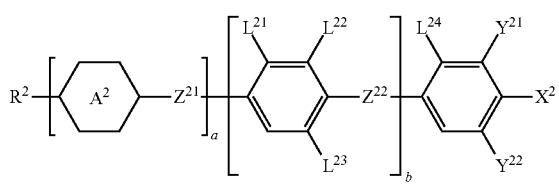

In Formula (2),
$R^2$ is hydrogen, a halogen, or an alkyl having 1 to 12 carbon atoms, provided that in this alkyl, at least one —CH$_2$— may be substituted with —O— or —S—, and at least one —(CH$_2$)$_2$— may be substituted with —CH=CH— or —C≡C—, and in these groups, at least one hydrogen may be substituted with a halogen;
ring $A^2$ is 1,4-cyclohexylene, 1,4-cyclohexenylene, tetrahydropyran-2,5-diyl, 1,3-dioxane-2,5-diyl, pyrimidine-2,5-diyl, 2,6,7-trioxabicyclo[2.2.2]octane-1,4-diyl, naphthalene-2,6-diyl, or pyridine-2,5-diyl, provided that at least one hydrogen on these rings may be substituted with a halogen or an alkyl having 1 to 3 carbon atoms;
$Z^{21}$ and $Z^{22}$ are each a single bond, —C≡C—, or —C≡C—C≡C—;
$L^{21}$, $L^{22}$, $L^{23}$, and $L^{24}$ are each hydrogen, a halogen, an alkyl having 1 to 3 carbon atoms, or a cycloalkyl having 3 to 5 carbon atoms;
$X^2$ is —C≡C—CF$_3$ or —C≡C—C≡N;
$Y^{21}$ and $Y^{22}$ are each hydrogen, a halogen, or an alkyl having 1 to 3 carbon atoms; and
a is 0 or 1, and b is 1, 2, or 3, provided that a sum of a and b is 1 or more and 3 or less.

Embodiment 6. The liquid crystal composition according to Embodiment 5, in which the liquid crystal composition contains at least one compound selected from the group of compounds represented by Formulas (2-1) to (2-8) as the compound represented by Formula (2).

(2-1)
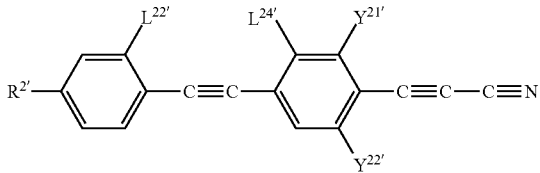

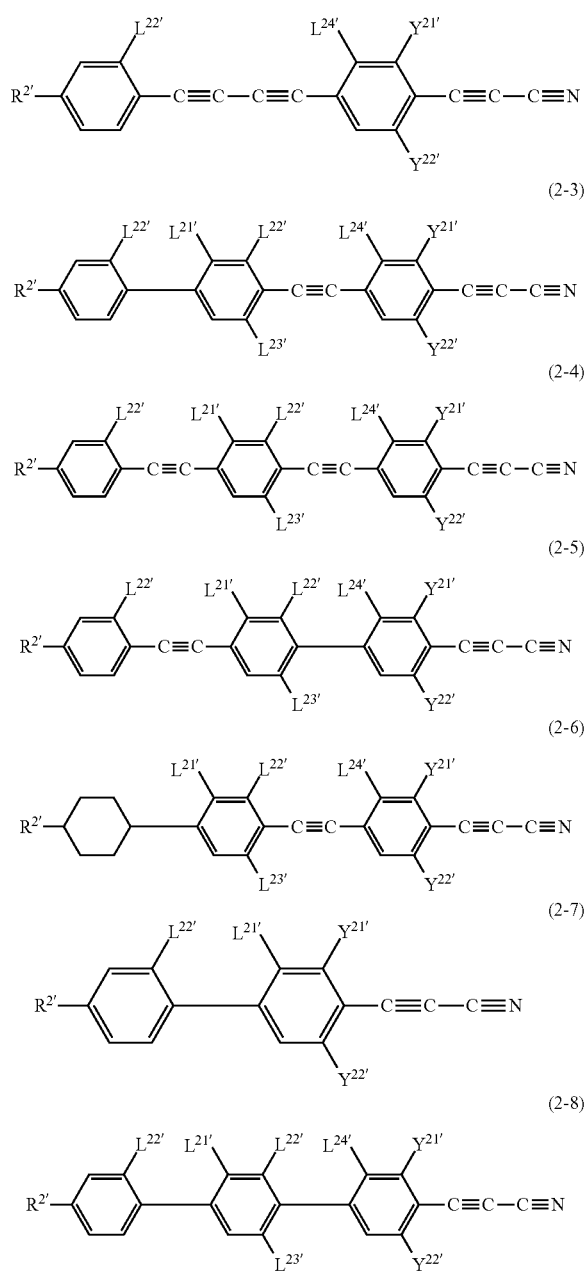

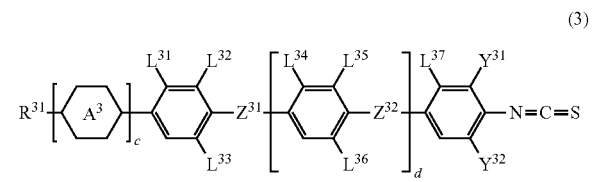

In Formulas (2-1) to (2-8),

R$^{2'}$ is an alkyl having 1 to 12 carbon atoms, provided that in this alkyl, at least one —(CH$_2$)$_2$— may be substituted with —CH=CH— or —C≡C—;

L$^{22'}$ is hydrogen, fluorine, chlorine, methyl, ethyl, or cyclopropyl; and

Y$^{21'}$ and Y$^{22'}$ are each hydrogen, fluorine, chlorine, methyl, or ethyl, in Formulas (2-1) and (2-2), L$^{24'}$ is hydrogen, fluorine, chlorine, methyl, ethyl, or cyclopropyl, in Formulas (2-3) to (2-6), and Formula (2-8), L$^{21'}$, L$^{23'}$, and L$^{24'}$ are each hydrogen, fluorine, chlorine, methyl, ethyl, or cyclopropyl, and in Formula (2-7), L$^{21'}$ is hydrogen, fluorine, chlorine, methyl, ethyl, or cyclopropyl.

Embodiment 7. The liquid crystal composition according to Embodiment 5 or 6, in which a proportion of the compound represented by Formula (2) is in a range of 5% by weight to 50% by weight based on a weight of the liquid crystal composition.

Embodiment 8. The liquid crystal composition according to any one of Embodiments 1 to 7, the liquid crystal composition containing at least one compound selected from compounds represented by Formula (3).

(3)

In Formula (3),

R$^{31}$ is hydrogen, a halogen, or an alkyl having 1 to 12 carbon atoms, provided that in this alkyl, at least one —CH$_2$— may be substituted with —O— or —S—, and at least one —(CH$_2$)$_2$— may be substituted with —CH=CH— or —C≡C—, and in these groups, at least one hydrogen may be substituted with a halogen;

ring A$^3$ is 1,4-cyclohexylene, 1,4-cyclohexenylene, tetrahydropyran-2,5-diyl, 1,3-dioxane-2,5-diyl, pyrimidine-2,5-diyl, 2,6,7-trioxabicyclo[2.2.2]octane-1,4-diyl, naphthalene-2,6-diyl, or pyridine-2,5-diyl, provided that at least one hydrogen on these rings may be substituted with a halogen or an alkyl having 1 to 3 carbon atoms;

Z$^{31}$ and Z$^{32}$ are each a single bond, —CH=CH—, —CF=CF—, —C≡C—, or —C≡C—C≡C—;

L$^{31}$, L$^{32}$, L$^{33}$, L$^{34}$, L$^{35}$, L$^{36}$, and L$^{37}$ are each hydrogen, a halogen, an alkyl having 1 to 3 carbon atoms, or a cycloalkyl having 3 to 5 carbon atoms;

Y$^{31}$ and Y$^{32}$ are each hydrogen, a halogen, or an alkyl having 1 to 3 carbon atoms; and c is 0 or 1, d is 0, 1, or 2, and a sum of c and d is 0 or more and 2 or less, provided that when a sum of c and d is 1, and Z$^{31}$ and Z$^{32}$ are each a single bond, L$^{31}$, L$^{32}$, L$^{33}$, L$^{34}$, L$^{35}$, L$^{36}$, L$^{37}$, Y$^{31}$, and Y$^{32}$ are each not an alkyl having 1 to 3 carbon atoms.

Embodiment 9. The liquid crystal composition according to Embodiment 8, in which the at least one compound selected from the compounds represented by Formula (3) includes a compound in which Y$^{31}$ and Y$^{32}$ are both fluorine.

Embodiment 10. The liquid crystal composition according to Embodiment 8, in which the liquid crystal composition contains at least one compound selected from the group of compounds represented by Formulas (3-1) to (3-8) as the compound represented by Formula (3).

(3-1)
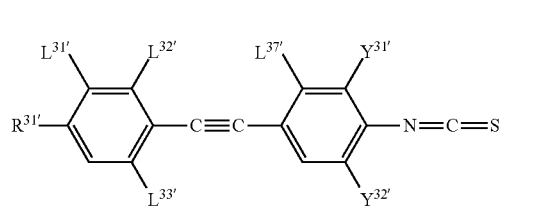

(3-2)
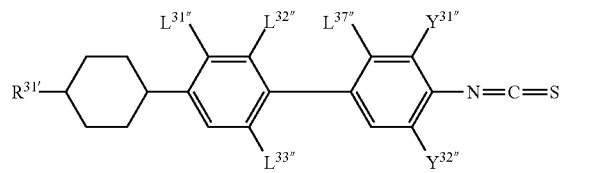

(3-3)
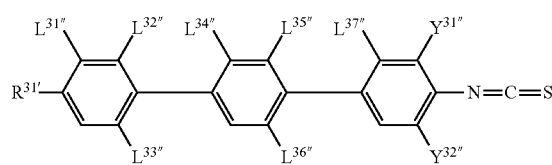

(3-4)
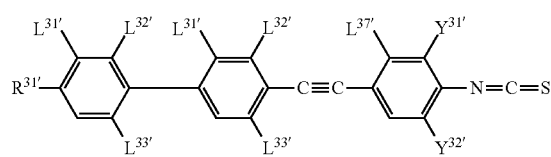

(3-5)
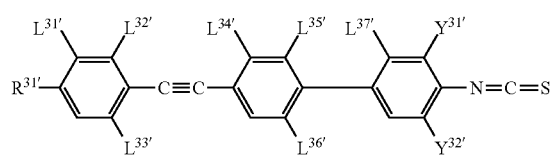

(3-6)
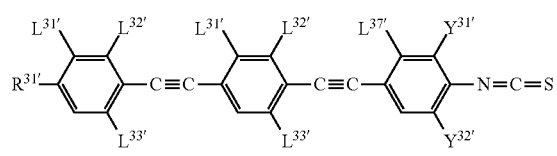

(3-7)
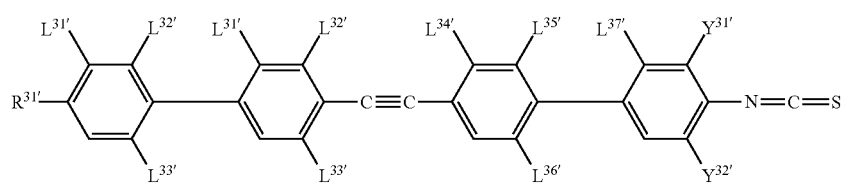

(3-8)
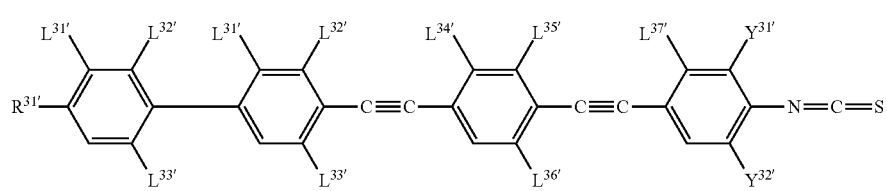

In Formula (3-1), and Formulas (3-4) to (3-8),
$R^{31'}$ is an alkyl having 1 to 12 carbon atoms, provided that in this alkyl, at least one —(CH$_2$)$_2$— may be substituted with —CH=CH— or —C≡C—;
$L^{31'}$, $L^{32'}$, $L^{33'}$, and $L^{37'}$ are each hydrogen, fluorine, chlorine, methyl, ethyl, or cyclopropyl; and
$Y^{31'}$ and $Y^{32'}$ are each hydrogen, fluorine, chlorine, methyl, or ethyl,
in Formulas (3-5), (3-7), and (3-8),
$L^{34'}$, $L^{35'}$, and $L^{36'}$ are each hydrogen, fluorine, chlorine, methyl, ethyl, or cyclopropyl,
in Formulas (3-2) and (3-3),
$R^{31'}$ is an alkyl having 1 to 12 carbon atoms, provided that in this alkyl, at least one —(CH$_2$)$_2$— may be substituted with —CH=CH— or —C≡C—;
$L^{31''}$, $L^{32''}$, $L^{33''}$, and $L^{37''}$ are each hydrogen, fluorine, chlorine, or cyclopropyl; and
$Y^{31''}$ and $Y^{32'}$ are each hydrogen, fluorine, or chlorine, and
in Formula (3-3),
$L^{34''}$, $L^{35''}$, and $L^{36'}$ are each hydrogen, fluorine, chlorine, or cyclopropyl.

Embodiment 11. The liquid crystal composition according to any one of Embodiments 8 to 10, in which a proportion of the compound represented by Formula (3) is in a range of 30% by weight to 80% by weight based on a weight of the liquid crystal composition.

Embodiment 12. The liquid crystal composition according to any one of Embodiments 1 to 11, the liquid crystal composition containing at least one compound selected from compounds represented by Formula (4).

(4)
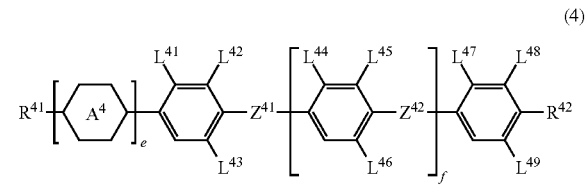

In Formula (4),
$R^{41}$ and $R^{42}$ are each hydrogen, a halogen, or an alkyl having 1 to 12 carbon atoms, provided that in this alkyl, at least one —CH$_2$— may be substituted with —O— or —S—, and at least one —(CH$_2$)$_2$— may be substituted with —CH=CH— or —C≡C—, and in these groups, at least one hydrogen may be substituted with a halogen;
ring $A^4$ is 1,4-cyclohexylene, 1,4-cyclohexenylene, tetrahydropyran-2,5-diyl, 1,3-dioxane-2,5-diyl, pyrimidine-2,5-diyl, 2,6,7-trioxabicyclo[2.2.2]octane-1,4-diyl, naphthalene-2,6-diyl, or pyridine-2,5-diyl, provided that at least one hydrogen on these rings may be substituted with a halogen or an alkyl having 1 to 3 carbon atoms;

$Z^{41}$ and $Z^{42}$ are each a single bond, —CH=CH—, —CF=CF—, —C≡C—, or —C≡C—C≡C—;

$L^{41}$, $L^{42}$, $L^{43}$, $L^{44}$, $L^{45}$, $L^{46}$, $L^{47}$, $L^{48}$, and $L^{49}$ are each hydrogen, a halogen, an alkyl having 1 to 3 carbon atoms, or a cycloalkyl having 3 to 5 carbon atoms; and e is 0 or 1, and f is 0, 1, or 2, provided that a sum of e and f is 0 or more and 2 or less.

Embodiment 13. The liquid crystal composition according to Embodiment 12, in which the liquid crystal composition contains at least one compound selected from the group of compounds represented by Formulas (4-1) to (4-6) as the compound represented by Formula (4).

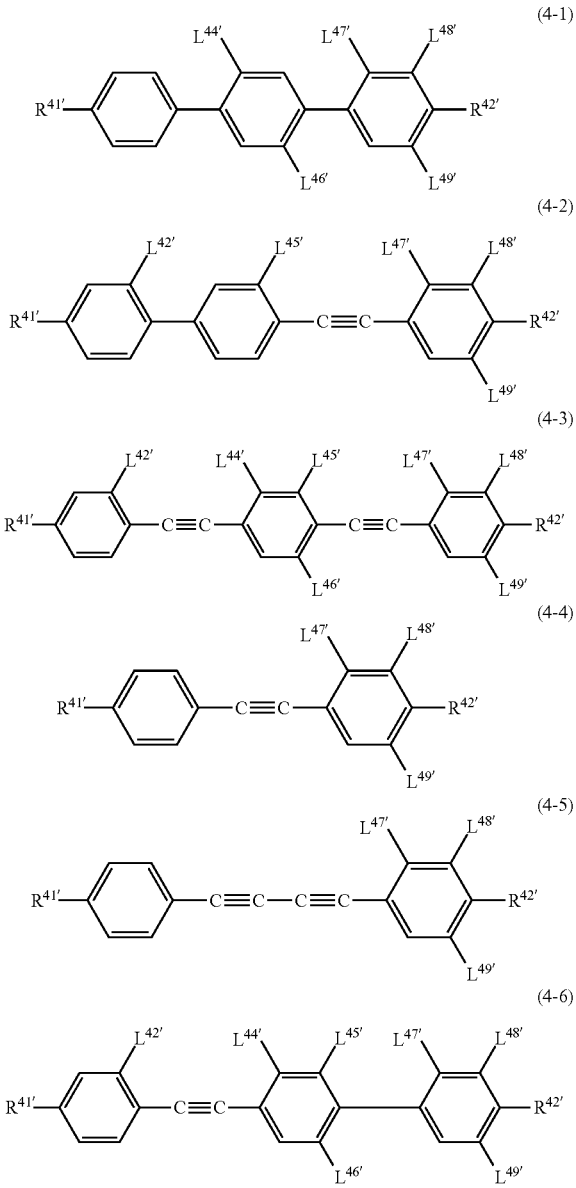

In Formulas (4-1) to (4-6), $R^{41'}$ and $R^{42'}$ are each an alkyl having 1 to 12 carbon atoms, provided that in this alkyl, at least one —(CH$_2$)$_2$— may be substituted with —CH=CH— or —C≡C—; and $L^{47'}$, $L^{48'}$, and $L^{49'}$ are each hydrogen, fluorine, chlorine, methyl, ethyl, or cyclopropyl, in Formula (4-1), $L^{44'}$ and $L^{46'}$ are each hydrogen, fluorine, chlorine, methyl, ethyl, or cyclopropyl, in Formula (4-2), $L^{42'}$ and $L^{45'}$ are each hydrogen, fluorine, chlorine, methyl, ethyl, or cyclopropyl, and in Formulas (4-3) and (4-6), $L^{42'}$, $L^{44'}$, $L^{45'}$, and $L^{46'}$ are each hydrogen, fluorine, chlorine, methyl, ethyl, or cyclopropyl.

Embodiment 14. The liquid crystal composition according to Embodiment 12 or 13, in which a proportion of the compound represented by Formula (4) is in a range of 10% by weight to 40% by weight based on a weight of the liquid crystal composition.

Embodiment 15. The liquid crystal composition according to any one of Embodiments 1 to 14, in which a refractive index anisotropy at 25° C. at a wavelength of 589 nm is 0.35 or more.

Embodiment 16. The liquid crystal composition according to any one of Embodiments 1 to 15, in which a dielectric constant anisotropy at 25° C. in a frequency range of less than 1 MHz is 5 or more.

Embodiment 17. The liquid crystal composition according to any one of Embodiments 1 to 16, in which a dielectric constant anisotropy at 25° C. in at least one frequency range of 1 GHz to 10 THz is in a range of 0.50 to 3.0.

Embodiment 18. The liquid crystal composition according to any one of Embodiments 1 to 17, further containing an optically active compound.

Embodiment 19. The liquid crystal composition according to any one of Embodiments 1 to 18, containing a polymerizable compound.

Embodiment 20. The liquid crystal composition according to any one of Embodiments 1 to 19, the liquid crystal composition containing at least one of an antioxidant, an ultraviolet absorber, an antistatic agent, and a dichroic dye.

Embodiment 21. An element which is used for switching and in which a dielectric constant can be reversibly controlled by reversibly changing an orientation direction of liquid crystal molecules, the element containing the liquid crystal composition according to any one of Embodiments 1 to 20.

Embodiment 22. An element which is used for controlling electromagnetic waves in a frequency range of 1 GHz to 10 THz, the element containing the liquid crystal composition according to any one of Embodiments 1 to 20.

Embodiment 23. A liquid crystal lens or a birefringent lens for stereoscopic image display, containing the liquid crystal composition according to any one of Embodiments 1 to 20.

DESCRIPTION OF THE EMBODIMENTS

According to the present disclosure, it is possible to satisfy high-frequency characteristics of a composition, such as a large dielectric constant anisotropy in a frequency region for performing electromagnetic wave control and a small dielectric loss tangent (tan δ), while having a high upper limit temperature of a nematic phase and a low lower limit temperature of a nematic phase. Furthermore, it becomes possible to provide a more preferable liquid crystal composition by satisfying at least one of characteristics of the composition, such as a large dielectric constant anisotropy at low frequencies for reduction of a driving voltage, a small viscosity, a large resistivity in a driving frequency region, and heat stability. An element using the liquid crystal composition of the present disclosure can exhibit excellent characteristics that enable electromagnetic wave control over a wide temperature range.

The terms in the present specification are used as follows. The terms "liquid crystal composition" and "electromagnetic wave control element" may each be simply called a "composition" and an "element." The term "electromagnetic wave control element" is a general term for electromagnetic wave control panel and electromagnetic wave control module. The term "liquid crystal compound" is a general term referring to a compound that has a liquid crystal phase such as a nematic phase and a smectic phase, and a compound that does not have a liquid crystal phase but is mixed into a composition for the purpose of adjusting characteristics such as a temperature range, a viscosity, and a dielectric constant anisotropy of a liquid crystal phase. For example, this compound has a six-membered ring such as 1,4-cyclohexylene and 1,4-phenylene, and its molecules (liquid crystal molecules) are rod-like. The term "polymerizable compound" is a compound added for the purpose of generating a polymer in a composition. Liquid crystal compounds having alkenyl are not classified as polymerizable compounds in that sense.

A liquid crystal composition is prepared by mixing a plurality of liquid crystal compounds. The proportion (content) of the liquid crystal compound is expressed in a weight percentage (% by weight) based on the weight of this liquid crystal composition. To this liquid crystal composition, the following additives are added as necessary: optically active compounds, antioxidants, ultraviolet absorbers, stabilizers with respect to ultraviolet rays and heat, quenchers, dyes (dichroic dyes), antifoaming agents, polymerizable compounds, polymerization initiators, polymerization inhibitors, antistatic agents, magnetic compounds, or the like. The proportion (addition amount) of the additive is expressed in a weight percentage (% by weight) based on the weight of the liquid crystal composition, as in the case of the proportion of the liquid crystal compound. Parts per million (ppm) by weight may also be used. The proportions of a polymerization initiator and a polymerization inhibitor are exceptionally expressed based on the weight of the polymerizable compound.

The term "upper limit temperature of a nematic phase" may be simply called an "upper limit temperature." The term "lower limit temperature of a nematic phase" may be simply called a "lower limit temperature." The expression "increase a dielectric constant anisotropy" means that a value thereof increases positively in the case of a composition with a positive dielectric constant anisotropy, and means that a value thereof increases negatively in the case of a composition with a negative dielectric constant anisotropy.

At least one compound selected from the group of compounds represented by Formula (1) may be simply called a "compound (1)." The term "compound (1)" means one compound or two or more compounds represented by Formula (1). The same applies to compounds represented by other formulas. The phrase "at least one" relating to the phrase "may be substituted" means that not only the position but also the number may be selected without limitation.

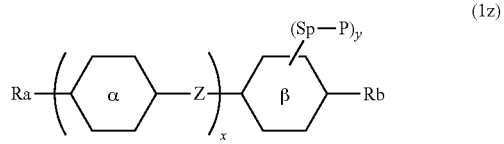

This will be explained using the following compound (1z) as an example. In Formula (1z), the symbols α and β enclosed in a hexagon correspond to a ring α and a ring β, respectively, and represent a ring such as a six-membered ring and a fused ring. When the subscript 'x' is 2, there are two rings α. The two groups represented by the two rings α may be the same or different. This rule applies to a plurality of rings α when the subscript 'x' is greater than 2. This rule also applies to other symbols such as a bonding group Z. A diagonal line across one side of the ring β indicates that an arbitrary hydrogen on the ring β may be substituted with a substituent (-Sp—P). The subscript 'y' indicates the number of substituents substituted. When the subscript 'y' is 0, there is no such substitution. When the subscript 'y' is 2 or greater, a plurality of substituents (-Sp—P) is present on the ring β. Also in this case, the rule "may be the same or different" is applied. This rule also applies when the symbol Ra is used for a plurality of compounds.

In Formula (1z), for example, the expression such as "Ra and Rb are each alkyl, alkoxy, or alkenyl" mean that Ra and Rb are independently selected from the group of alkyl, alkoxy, and alkenyl. The group represented by Ra and the group represented by Rb may be the same or different. This rule also applies when the symbol Ra is used for a plurality of compounds. This rule also applies when a plurality of Ra's is used in one compound.

At least one compound selected from the compounds represented by Formula (1z) may be simply called a "compound (1z)." The "compound (1z)" means one compound, a mixture of two compounds, or a mixture of three or more compounds represented by Formula (1z). The same applies to compounds represented by other formulas. The expression "at least one compound selected from the compounds represented by Formula (1z) and Formula (2z)" means at least one compound selected from the group of the compound (1z) and a compound (2z).

The expression "at least one 'A'" means that the number of 'A's is arbitrary. The expression "at least one 'A' may be substituted with 'B'" means that when the number of 'A's is one, the position of 'A' is arbitrary, and also when the number of 'A's is two or more, their positions can be selected without limitation. The expression "at least one —$CH_2$— may be substituted with —O—" may be used. In this case, —$CH_2$—$CH_2$—$CH_2$— may be converted to —O—$CH_2$—O— by substituting non-adjacent —$CH_2$— with —O—. However, adjacent —$CH_2$— is not substituted with —O—. This is because —O—O—$CH_2$— (peroxide) is generated in this substitution.

The alkyl of the liquid crystal compound is a straight-chain alkyl or a branched-chain alkyl, and does not include cycloalkyl unless otherwise specified. Straight chain alkyls are preferable over branched chain alkyls. The same applies to terminal groups such as alkoxy and alkenyl. Regarding the steric configuration of 1,4-cyclohexylene, trans is preferable to cis in order to raise the upper limit temperature. 2-Fluoro-1,4-phenylene means the following two divalent groups. In the chemical formula, fluorine may be oriented to the left (L) or oriented to the right (R). This rule also applies to asymmetric ring divalent groups such as 2,5-difluoro-1,4-phenylene, 2,6-difluoro-1,4-phenylene, pyridine-2,5-diyl, pyrimidine-2,5-diyl, 1,3-dioxane-2,5-diyl, and tetrahydropyran-2,5-diyl. Preferable tetrahydropyran-2,5-diyl is oriented to the right (R) in order to raise the upper limit temperature.

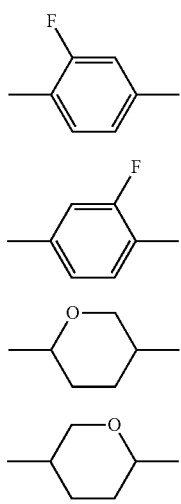

Benzo[b]thiophene-2,5-diyl and benzo[b]thiophene-2,6-diyl are each represented by the following structural formulas.

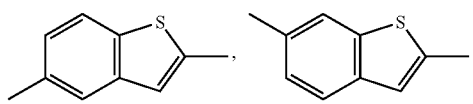

When at least one hydrogen on these rings is substituted with a halogen or an alkyl having 1 to 3 carbon atoms, the following structure is preferable from the viewpoint of ease of synthesis.

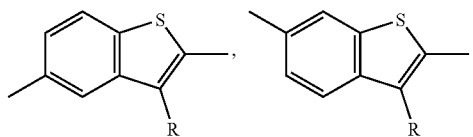

R is a halogen or an alkyl having 1 to 3 carbon atoms.

Similarly, a bonding group such as carbonyloxy may be —COO— or may be —OCO—.

In the chemical formulas of the component compounds, the symbol for a terminal group $R^1$ is used for a plurality of compounds. In these compounds, groups represented by arbitrary two $R^{1'}$ s may be the same or different. For example, there are cases in which $R^{1'}$ of a compound (1-1) is methyl and $R^{1'}$ of a compound (1-2) is ethyl. In some cases, $R^{1'}$ of the compound (1-1) is ethyl and $R^{1'}$ of the compound (1-2) is propyl. This rule also applies to symbols such as $R^2$, $R^{31}$, and $R^{32}$.

The present disclosure also includes the following embodiments. The above-mentioned composition further containing at least one selected from additives such as optically active compounds, antioxidants, ultraviolet absorbers, stabilizers with respect to ultraviolet rays and heat, quenchers, dyes (dichroic dyes), antifoaming agents, polymerizable compounds, polymerization initiators, polymerization inhibitors, antistatic agents, and magnetic compounds. (b) An element containing the above-mentioned composition. (c) An element containing the above-mentioned composition and used for controlling an electromagnetic wave signal having any frequency of 1 GHz to 10 THz. (d) The above-mentioned composition further containing a polymerizable compound, and an element containing this composition. (e) Use of the above-mentioned composition as a composition having a nematic phase. (f) Use as an optically active composition by adding an optically active compound to the above-mentioned composition.

A liquid crystal composition of the present disclosure has a large dielectric constant anisotropy and a small dielectric loss tangent (tan δ) in a frequency region of electromagnetic wave signals in a range of 1 GHz to 10 THz. Therefore, it can be suitably used as an element relating to electromagnetic waves (microwaves) not only in a range of 1 GHz to 10 THz but also in a range of 1 GHz to 50 GHz.

The composition of the present disclosure will be explained in the following order. First, the structure of component compounds in the composition will be explained. Second, the main characteristics of the component compounds, and the main effect of this compound on the composition will be explained. Third, the combination of the components in the composition, the preferable proportions of the components, and the basis thereof will be explained. Fourth, preferable forms of the component compounds will be explained. Fifth, preferable component compounds will be described. Sixth, additives that may be added to the composition will be explained. Seventh, a method for synthesizing the component compounds will be explained. Finally, the usage of the composition will be explained.

First, the structure of the component compounds in the composition will be explained. The compositions of the present disclosure are classified into a composition A and a composition B. The composition A may further contain other liquid crystal compounds, additives, or the like, in addition to the liquid crystal compound selected from the compound (1), a compound (2), and a compound (3). The "other liquid crystal compounds" are liquid crystal compounds different from the compound (1), the compound (2), and the compound (3). Such compounds are mixed into the composition for the purpose of further adjusting characteristics. Additives are as follows: optically active compounds, antioxidants, ultraviolet absorbers, stabilizers with respect to ultraviolet rays and heat, quenchers, dyes (dichroic dyes), antifoaming agents, polymerizable compounds, polymerization initiators, polymerization inhibitors, antistatic agents, polar compounds, and the like.

The composition B is substantially composed only of the liquid crystal compound selected from the compound (1), the compound (2), and the compound (3). The term "substantially" means that the composition may contain additives but does not contain the other liquid crystal compounds. The composition B has fewer components as compared to the composition A. The composition B is preferable to the composition A from the viewpoint of lowering costs. The composition A is more preferable than the composition B from the viewpoint that the characteristics can be further adjusted by mixing the other liquid crystal compounds.

Second, the main characteristics of the component compounds, and the main effect of this compound on the characteristics of the composition will be explained. The main characteristics of the component compounds are summarized in Table 1 based on the effects of the present disclosure. In the symbols in Table 1, L means large or high, M means medium, and S means small or low. The symbols L, M, S are classifications based on qualitative comparisons between the component compounds, and 0 (zero) means that a value is approximately zero or close to zero.

TABLE 1

| Characteristics of compounds | | | | |
|---|---|---|---|---|
| Compound | (1) | (2) | (3) | (4) |
| Upper limit temperature | From S to M | From S to L | From S to L | From S to L |
| Viscosity | M | From M to L | M | From S to M |
| Refractive index anisotropy | L | L | L | L |
| Dielectric constant anisotropy | From S to M | From M to L | From S to M | 0 |

When the component compounds are mixed into the composition, the main effects of the component compounds on the characteristics of the composition are as follows.

The compound (1) mainly has the effect of increasing the refractive index anisotropy of the liquid crystal composition, increasing the dielectric constant anisotropy, and decreasing tan δ at high frequencies. By controlling the number of substituents on a benzene ring of the compound (1), the upper limit temperature and the lower limit temperature can be controlled to some extent. In other words, when the number of substituents becomes smaller, the upper limit temperature and the lower limit temperature tend to become higher. When the number of substituents becomes larger, the upper limit temperature and the lower limit temperature tend to become lower. From the viewpoint of lowering the lower limit temperature of the liquid crystal composition, the number of substituents is preferably large. The resistivity of the compound (1) generally tends to be low.

The compound (2) mainly has the effect of increasing the refractive index anisotropy of the liquid crystal composition and increasing the dielectric constant anisotropy more than the compound (1). In order to realize high switching characteristics and high energy efficiency, the dielectric constant anisotropy is preferably large. The upper limit temperature and the viscosity can be controlled to some extent by selecting the sum of a and b in the compound (2). In other words, when the sum of a and b becomes smaller, the upper limit temperature tends to become lower, and the viscosity tends to become smaller. When the sum of a and b becomes larger, the upper limit temperature tends to become higher, and the viscosity tends to become larger.

The compound (3) mainly has the effect of increasing the refractive index anisotropy of the liquid crystal composition and increasing the dielectric constant anisotropy. The relationship between the number of rings contained in the compound (the sum of c and d in Formula (3)), the upper limit temperature, and the viscosity tends to be similar to that of the compound (2). The resistivity of the compound (3) generally tends to be low.

A compound (4) mainly has the effect of expanding the temperature range of the nematic phase while increasing the refractive index anisotropy. The relationship between the number of rings contained in the compound (the sum of e and f in Formula (4)), the upper limit temperature, and the viscosity tends to be similar to that of the compound (2) and the compound (3), but the compound (4) tends to be more effective in raising the upper limit temperature, lowering the lower limit temperature, and decreasing the viscosity than the compound (2) and the compound (3).

Third, the combination of the components in the composition, the preferable proportions of the component compounds, and the basis thereof will be explained. A preferable combination of the components in the composition is compound (1)+compound (2), compound (1)+compound (3), or compound (1)+compound (2)+compound (3). In addition, a composition composed only of the compound (1) can also be prepared. A particularly preferable combination is compound (1)+compound (2)+compound (3) from the viewpoint of further increasing the refractive index anisotropy and the dielectric constant anisotropy and decreasing the viscosity.

Based on the weight of the liquid crystal composition, the preferable proportion of the compound (1) is in a range of about 5% by weight to about 40% by weight to expand the temperature range of the nematic phase while increasing the refractive index anisotropy, maintaining Δε at 28 GHz to a large value, and making tan δ at 28 GHz small. A further preferable proportion is in a range of about 10% by weight to about 30% by weight. A particularly preferable proportion is in a range of about 10% by weight to about 25% by weight.

Based on the weight of the liquid crystal composition, the preferable proportion of the compound (2) is in a range of about 5% by weight to about 50% by weight to increase the dielectric constant anisotropy and increase the refractive index anisotropy while minimizing an increase in lower limit temperature. A further preferable proportion is in a range of about 5% by weight to about 40% by weight. A particularly preferable proportion is in a range of about 10% by weight to about 40% by weight.

Based on the weight of the liquid crystal composition, the preferable proportion of the compound (3) is in a range of about 30% by weight to about 90% by weight to expand the temperature range of the nematic phase while increasing the refractive index anisotropy and making Δε at 28 GHz large. A further preferable proportion is in a range of about 30% by weight to about 85% by weight. A particularly preferable proportion is in a range of about 30% by weight to about 80% by weight.

Based on the weight of the liquid crystal composition, the preferable proportion of the compound (4) is about 5% by weight or more to expand the temperature range of the nematic phase while increasing the refractive index anisotropy, and is about 30% by weight or less to increase the dielectric constant anisotropy. A further preferable proportion is in a range of about 5% by weight to about 20% by weight. A particularly preferable proportion is in a range of about 5% by weight to about 10% by weight.

Fourth, preferable forms of the component compounds will be explained. $R^1$, $R^2$, $R^{31}$, and $R^{41}$ are each hydrogen, a halogen, or an alkyl having 1 to 12 carbon atoms, provided that in this alkyl, at least one —$CH_2$— may be substituted with —O— or —S—, and at least one —$(CH_2)_2$— may be substituted with —CH=CH— or —C≡C—, and in these groups, at least one hydrogen may be substituted with a halogen.

Preferable $R^1$, $R^2$, $R^{31}$, or $R^{41}$ is methyl, ethyl, propyl, butyl, pentyl, hexyl, methoxy, or ethoxy in order to increase stability with respect to ultraviolet rays or heat. Methyl, ethyl, propyl, butyl, pentyl, methoxy, or ethoxy are preferable to decrease the viscosity.

$R^{1'}$, $R^{2'}$, $R^{31'}$, and $R^{41'}$ are each an alkyl having 1 to 12 carbon atoms, provided that in this alkyl, at least one —$(CH_2)_2$— may be substituted with —CH=CH— or —C≡C—.

a is 0 or 1, and b is 1, 2, or 3, provided that the sum of a and b is 1 or more and 3 or less. Preferably, a is 0 to increase the refractive index anisotropy and decrease the viscosity, and is 1 to lower the lower limit temperature. Preferably, b is 1 to lower the lower limit temperature and decrease the viscosity, and is 2 or 3 to increase the refractive index anisotropy and raise the upper limit temperature. A preferable sum of a and b is 2 or 3 to increase the refractive index anisotropy and to raise the upper limit temperature.

c is 0 or 1, and d is 0, 1, or 2, provided that the sum of c and d is 0 or more and 2 or less. Preferably, c is 0 to increase the refractive index anisotropy and decrease the viscosity, and is 1 to lower the lower limit temperature. Preferably, d is 0 to lower the lower limit temperature and decrease the viscosity, and is 1 or 2 to increase the refractive index anisotropy and raise the upper limit temperature. A preferable sum of c and d is 0 or 1 to increase the refractive index anisotropy and to lower the lower limit temperature.

e is 0 or 1, and f is 0, 1, or 2, provided that the sum of e and f is 0 or more and 2 or less. Preferably, e is 0 to increase the refractive index anisotropy and decrease the viscosity. Preferably, f is 0 to lower the lower limit temperature and decrease the viscosity, and is 1 or 2 to increase the refractive index anisotropy and raise the upper limit temperature. A preferable sum of e and f is 0 to lower the lower limit temperature and decrease the viscosity, and is 1 or 2 to increase the refractive index anisotropy and raise the upper limit temperature.

$Z^{21}$ and $Z^{22}$ are each a single bond, —C≡C—, or —C≡C—C≡C—. Preferable $Z^{21}$ and $Z^{22}$ are each a single bond to decrease the viscosity, and are each —C≡C— or —C≡C—C≡C— to increase the refractive index anisotropy.

$Z^{31}$ and $Z^{32}$ are each a single bond, —CH=CH—, —CF=CF—, —C≡C—, or —C≡C—C≡C—, but at least one of them is not a single bond. Preferable $Z^{31}$ and $Z^{32}$ are each a single bond to decrease the viscosity, and are each —CH=CH— or —C≡C— to increase the refractive index anisotropy.

$Z^{41}$ and $Z^{42}$ are each a single bond, —CH=CH—, —CF=CF—, —C≡C—, or —C≡C—C≡C—. Preferable $Z^{41}$ and $Z^{42}$ are each a single bond to decrease the viscosity, and are each —C≡C— or —C≡C—C≡C— to increase the refractive index anisotropy.

Ring $A^1$ is 1,4-cyclohexylene, 1,4-cyclohexenylene, 1,4-phenylene, tetrahydropyran-2,5-diyl, 1,3-dioxane-2,5-diyl, pyrimidine-2,5-diyl, 2,6,7-trioxabicyclo[2.2.2]octane-1,4-diyl, naphthalene-2,6-diyl, or pyridine-2,5-diyl, provided that at least one hydrogen on these rings may be substituted with a halogen or an alkyl having 1 to 3 carbon atoms.

Preferable ring $A^1$ is 1,4-cyclohexylene, 1,4-phenylene, pyrimidine-2,5-diyl, naphthalene-2,6-diyl, or pyridine-2,5-diyl, 1,4-Cyclohexylene or 1,4-phenylene are more preferable.

Ring $A^2$, ring $A^3$, and ring $A^4$ are each 1,4-cyclohexylene, 1,4-cyclohexenylene, tetrahydropyran-2,5-diyl, 1,3-dioxane-2,5-diyl, pyrimidine-2,5-diyl, 2,6,7-trioxabicyclo[2.2.2]octane-1,4-diyl, naphthalene-2,6-diyl, or pyridine-2,5-diyl, provided that at least one hydrogen on these rings may be substituted with a halogen or an alkyl having 1 to 3 carbon atoms.

Preferable ring $A^2$, ring $A^3$, and ring $A^4$ are each 1,4-cyclohexylene, pyrimidine-2,5-diyl, naphthalene-2,6-diyl, or pyridine-2,5-diyl, 1,4-Cyclohexylene is more preferable.

$L^{11}$, $L^{12}$, $L^{13}$, $L^{14}$, $L^{15}$, $L^{16}$, $L^{21}$, $L^{22}$, $L^{23}$, $L^{24}$, $L^{31}$, $L^{32}$, $L^{33}$, $L^{34}$, $L^{35}$, $L^{36}$, $L^{37}$, $L^{41}$, $L^{42}$, $L^{43}$, $L^{44}$, $L^{45}$, $L^{46}$, $L^{47}$, $L^{48}$, and $L^{49}$ are each hydrogen, a halogen, an alkyl having 1 to 3 carbon atoms, or a cycloalkyl having 3 to 5 carbon atoms. $L^{11}$, $L^{12}$, $L^{13}$, $L^{14}$, $L^{15}$, $L^{16}$, $L^{21}$, $L^{22}$, $L^{23}$, $L^{24}$, $L^{31}$, $L^{32}$, $L^{33}$, $L^{34}$, $L^{35}$, $L^{36}$, $L^{37}$, $L^{41}$, $L^{42}$, $L^{43}$, $L^{44}$, $L^{45}$, $L^{46}$, $L^{47}$, $L^{48}$, or $L^{49}$ is hydrogen to raise the upper limit temperature, is fluorine or chlorine to increase the dielectric constant anisotropy, and is fluorine, chlorine, methyl, ethyl, or cyclopropyl to lower the lower limit temperature.

$L^{11'}$, $L^{12'}$, $L^{13'}$, and $L^{14'}$ are each fluorine, chlorine, methyl, ethyl, or cyclopropyl.

$L^{15'}$, $L^{16'}$, $L^{21'}$, $L^{22'}$, $L^{23'}$, $L^{24'}$, $L^{31'}$, $L^{32'}$, $L^{33'}$, $L^{34'}$, $L^{35'}$, $L^{36'}$, $L^{37'}$, $L^{42'}$, $L^{44'}$, $L^{45'}$, $L^{46'}$, $L^{47'}$, $L^{48'}$, and $L^{49'}$ are each hydrogen, fluorine, chlorine, methyl, ethyl, or cyclopropyl.

$Y^{11}$, $Y^{12}$, $Y^{21}$, $Y^{22}$, $Y^{31}$, and $Y^{32}$ are each hydrogen, a halogen, or an alkyl having 1 to 3 carbon atoms. Preferable $Y^{11}$, $Y^{12}$, $Y^{21}$, or $Y^{22}$ is hydrogen to increase the refractive index anisotropy, is fluorine or chlorine to increase the dielectric constant anisotropy, and is methyl or ethyl to lower the lower limit temperature.

$Y^{11'}$, $Y^{12'}$, $Y^{21'}$, $Y^{22'}$, $Y^{31'}$, and $Y^{32'}$ are each hydrogen, fluorine, chlorine, methyl, or ethyl.

In Formula (1), at least one of $L^{11}$, $L^{12}$, $L^{13}$, $L^{14}$, $L^{15}$, $Y^{11}$, and $Y^{12}$ is an alkyl having 1 to 3 carbon atoms. At least two of $L^{11}$, $L^{12}$, $L^{13}$, $L^{14}$, $L^{15}$, $Y^{11}$, and $Y^{12}$ are preferably not hydrogen. To lower the lower limit temperature, one or two of $L^{11}$, $L^{12}$, $L^{13}$, and $L^{14}$ are preferably fluorine or methyl, and one or two of $L^{15}$, $L^{16}$, $Y^{11}$, and $Y^{12}$ are preferably methyl.

In Formula (3), when a sum of c and d is 1, and $Z^{31}$ and $Z^{32}$ are each a single bond, $L^{31}$, $L^{32}$, $L^{33}$, $L^{34}$, $L^{35}$, $L^{36}$, $L^{37}$, $Y^{31}$, and $Y^{32}$ are each not an alkyl having 1 to 3 carbon atoms.

To increase the dielectric constant anisotropy of the entire liquid crystal composition, $L^{11}$ and $L^{12}$, $L^{14}$ and $Y^{11}$, $L^{15}$ and $Y^{12}$, $L^{21}$ and $L^{22}$, $L^{24}$ and $Y^{21}$, $L^{31}$ and $L^{32}$, $L^{34}$ and $L^{35}$, $L^{37}$ and $L^{38}$, $L^{41}$ and $L^{42}$, $L^{44}$ and $L^{45}$, or $L^{47}$ and $L^{48}$ are not preferably both halogen.

$X^2$ is —C≡C—$CF_3$ or —C≡C—C≡N. Preferable $X^2$ is —C≡C—C≡N to increase the refractive index anisotropy.

Fifth, preferable component compounds will be described.

Preferable compounds (1) are the compounds (1-1) to (1-8).

(1-1) 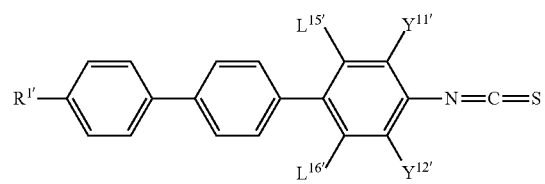

(1-2) 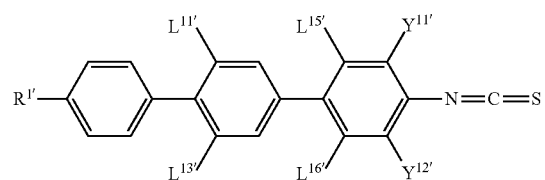

(1-3) 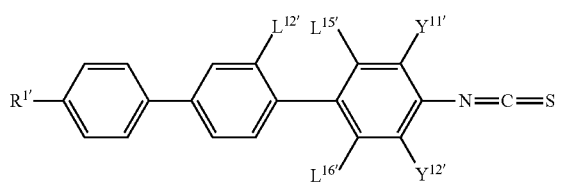

(1-4) 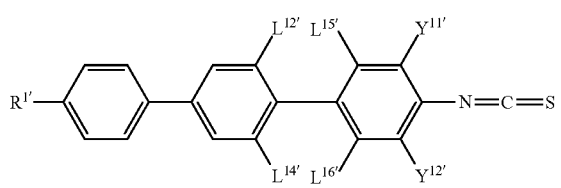

(1-5) 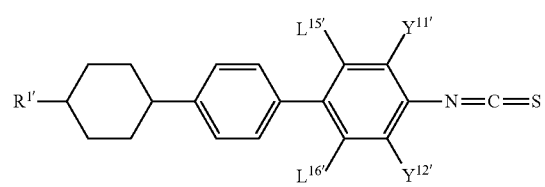

(1-6) 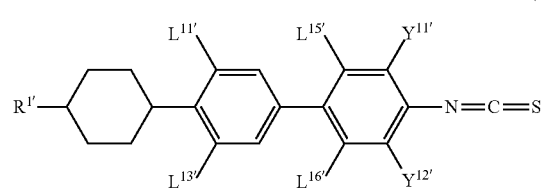

(1-7) 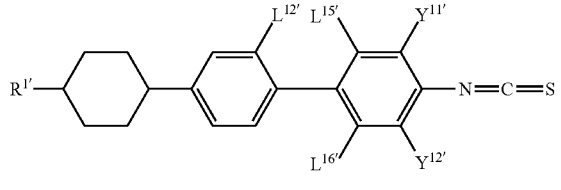

(1-8) 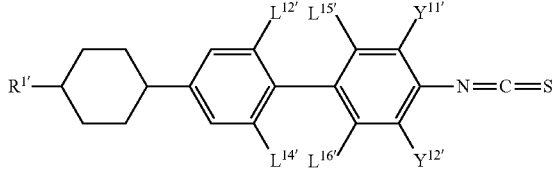

In Formulas (1-1) to (1-8), $R^{1\prime}$ is an alkyl having 1 to 12 carbon atoms, provided that in this alkyl, at least one —(CH$_2$)$_2$— may be substituted with —CH=CH— or —C≡C—;

$L^{15\prime}$ and $L^{16\prime}$ are each hydrogen, fluorine, chlorine, methyl, ethyl, or cyclopropyl;

$Y^{11\prime}$ and $Y^{12\prime}$ are each hydrogen, fluorine, chlorine, methyl, or ethyl; and at least one of $L^{15\prime}$, $L^{16\prime}$, $Y^{11\prime}$, and $Y^{12\prime}$ is methyl or ethyl, in Formulas (1-2) and (1-6), $L^{11\prime}$ and $L^{13\prime}$ are each fluorine, chlorine, methyl, ethyl, or cyclopropyl, in Formulas (1-3) and (1-7), $L^{12\prime}$ is fluorine, chlorine, methyl, ethyl, or cyclopropyl, in Formulas (1-4) and (1-8), $L^{12\prime}$ and $L^{14\prime}$ are each fluorine, chlorine, methyl, ethyl, or cyclopropyl, and in Formulas (1-1) and (1-5), at least two of $L^{15\prime}$, $L^{16\prime}$, $Y^{11\prime}$, and $Y^{12\prime}$ are not hydrogen.

At least one of the compounds (1) is preferably the compound (1-1), the compound (1-3), the compound (1-5), or the compound (1-7).

Preferable compounds (2) are compounds (2-1) to (2-8).

(2-1) 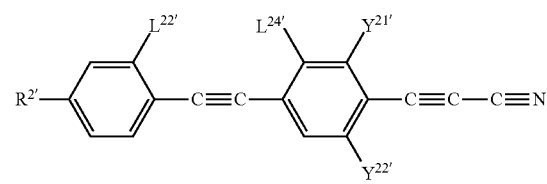

(2-2) 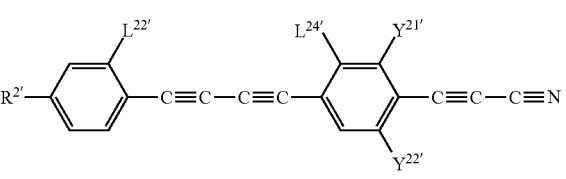

(2-3) 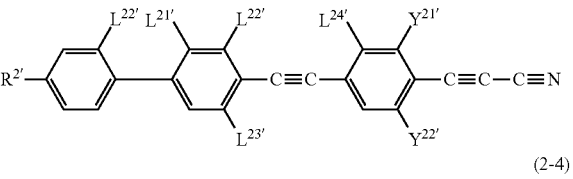

(2-4) 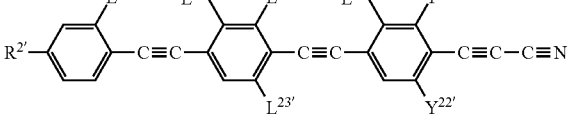

(2-5)
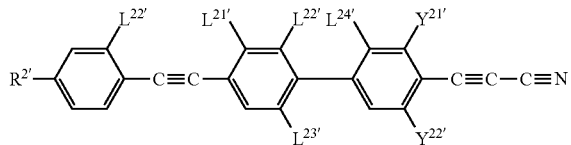

(2-6)
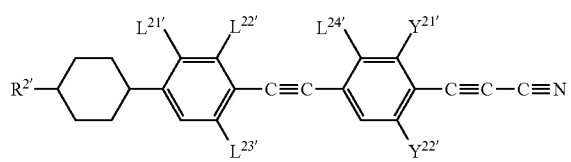

(2-7)
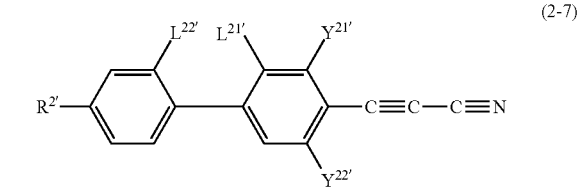

(2-8)
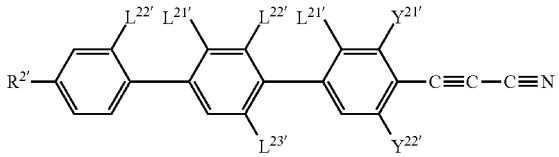

In Formulas (2-1) to (2-8), $R^{2'}$ is an alkyl having 1 to 12 carbon atoms, provided that in this alkyl, at least one —$(CH_2)_2$— may be substituted with —CH=CH— or —C≡C—;

$L^{22'}$ is hydrogen, fluorine, chlorine, methyl, ethyl, or cyclopropyl; and $Y^{21'}$ and $Y^{22'}$ are each hydrogen, fluorine, chlorine, methyl, or ethyl, in Formulas (2-1) and (2-2), $L^{24'}$ is hydrogen, fluorine, chlorine, methyl, ethyl, or cyclopropyl, in Formulas (2-3) to (2-6), and Formula (2-8), $L^{21'}$, $L^{23'}$, and $L^{24'}$ are each hydrogen, fluorine, chlorine, methyl, ethyl, or cyclopropyl, and in Formula (2-7), $L^{21'}$ is hydrogen, fluorine, chlorine, methyl, ethyl, or cyclopropyl.

At least one of the compounds (2) is preferably the compound (2-1), the compound (2-3), or the compound (2-4).

Preferable compounds (3) are compounds (3-1) to (3-8).

(3-1)
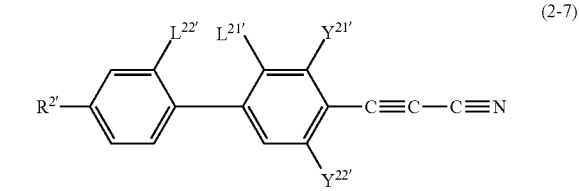

(3-2)
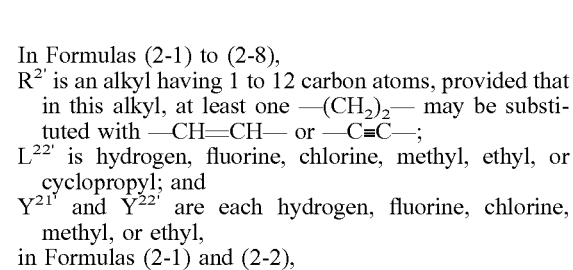

(3-3)
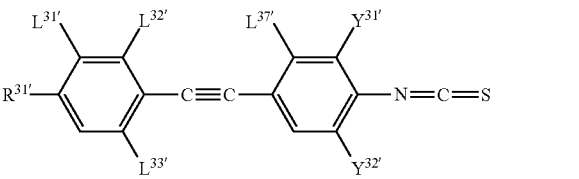

(3-4)
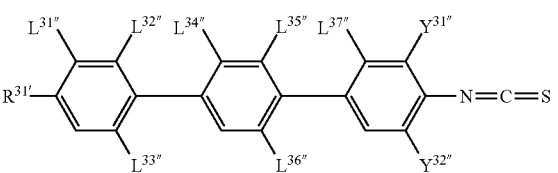

(3-5)
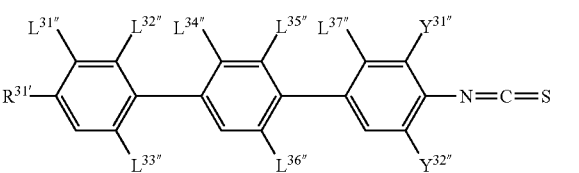

(3-6)
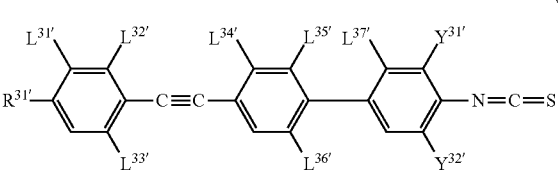

(3-7)
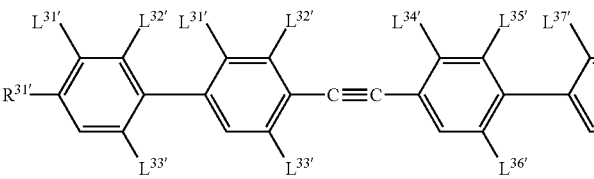

-continued

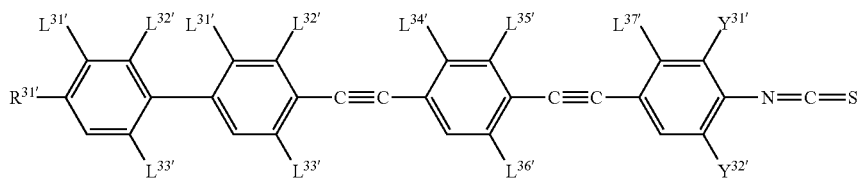
(3-8)

In Formula (3-1), and Formulas (3-4) to (3-8),
$R^{31'}$ is an alkyl having 1 to 12 carbon atoms, provided that in this alkyl, at least one —$(CH_2)_2$— may be substituted with —CH=CH— or —C≡C—;
$L^{31'}$, $L^{32'}$, $L^{33'}$, and $L^{37'}$ are each hydrogen, fluorine, chlorine, methyl, ethyl, or cyclopropyl; and
$Y^{31'}$ and $Y^{32'}$ are each hydrogen, fluorine, chlorine, methyl, or ethyl,
in Formulas (3-5), (3-7), and (3-8),
$L^{34'}$, $L^{35'}$, and $L^{36'}$ are each hydrogen, fluorine, chlorine, methyl, ethyl, or cyclopropyl,
in Formulas (3-2) and (3-3),
$R^{31'}$ is an alkyl having 1 to 12 carbon atoms, provided that in this alkyl, at least one —$(CH_2)_2$— may be substituted with —CH=CH— or —C≡C—;
$L^{31''}$, $L^{32''}$, $L^{33''}$, and $L^{37''}$ are each hydrogen, fluorine, chlorine, or cyclopropyl; and
$Y^{31''}$ and $Y^{32''}$ are each hydrogen, fluorine, or chlorine, and
in Formula (3-3),
$L^{34''}$, $L^{35''}$, and $L^{36'}$ are each hydrogen, fluorine, chlorine, or cyclopropyl.

At least one of the compounds (3) is preferably the compound (3-1), the compound (3-2), the compound (3-3), the compound (3-4), the compound (3-5), or the compound (3-6). At least two of the compounds (3) are more preferably the compound (3-1) and the compound (3-2), the compound (3-1) and the compound (3-3), the compound (3-1) and the compound (3-4), the compound (3-1) and the compound (3-5), or a combination of the compound (3-1) and the compound (3-6).

Preferable compounds (4) are compounds (4-1) to (4-6).

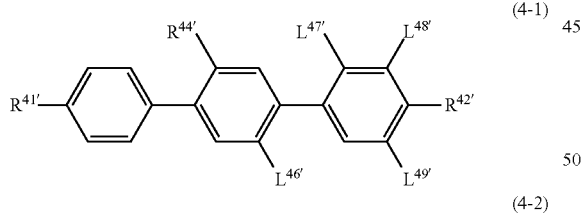
(4-1)

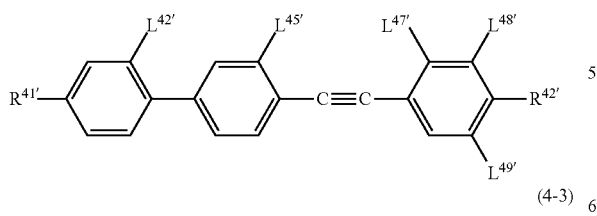
(4-2)

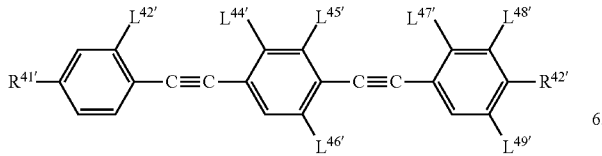
(4-3)

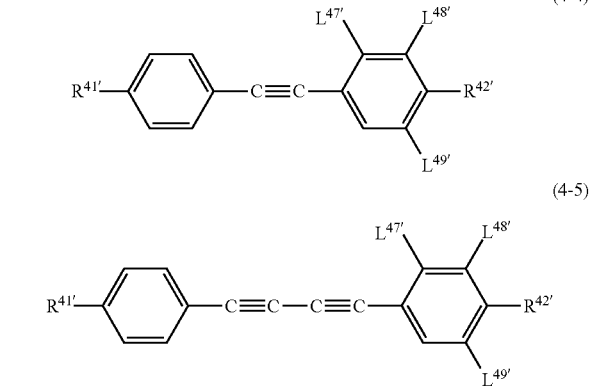
(4-4)
(4-5)
(4-6)

In Formulas (4-1) to (4-6),
$R^{41'}$ and $R^{42'}$ are each an alkyl having 1 to 12 carbon atoms, provided that in this alkyl, at least one —$(CH_2)_2$— may be substituted with —CH=CH— or —C≡C—; and
$L^{47'}$, $L^{48'}$, and $L^{49'}$ are each hydrogen, fluorine, chlorine, methyl, ethyl, or cyclopropyl,
in Formula (4-1),
$L^{44'}$ and $L^{46'}$ are each hydrogen, fluorine, chlorine, methyl, ethyl, or cyclopropyl,
in Formula (4-2),
$L^{42'}$ and $L^{45'}$ are each hydrogen, fluorine, chlorine, methyl, ethyl, or cyclopropyl, and
in Formulas (4-3) and (4-6),
$L^{42'}$, $L^{44'}$, $L^{45'}$, and $L^{46'}$ are each hydrogen, fluorine, chlorine, methyl, ethyl, or cyclopropyl.

At least one of the compounds (4) is preferably the compound (4-2), the compound (4-3), the compound (4-4), or the compound (4-5).

Sixth, additives that may be added to the composition will be explained. Such additives are as follows: optically active compounds, antioxidants, ultraviolet absorbers, stabilizers with respect to ultraviolet rays and heat, quenchers, dyes (dichroic dyes), antifoaming agents, polymerizable compounds, polymerization initiators, polymerization inhibitors, antistatic agents, polar compounds, and the like. Hereinbelow, the mixing ratio of these additives is the ratio (weight) based on the weight of the liquid crystal composition, unless otherwise specified.

A combination of additives used is arbitrary, and for example, it is also possible to use a combination of different types of antioxidants. It is also possible to use a combination of different types of additives. For example, a combination of an antioxidant, an ultraviolet absorber, and a stabilizer may be used.

An optically active compound is added to the composition for the purpose of inducing a helical structure of the liquid crystal to impart a twisted angle. Examples of such compounds are compounds (5-1) to (5-5). A preferable proportion of the optically active compound is about 5% by weight or less. A more preferable proportion is in a range of about 0.01% by weight to about 2% by weight.

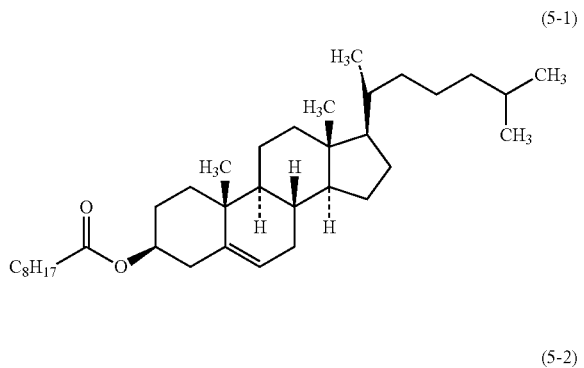

(5-1)

(5-2)

(5-3)

(5-4)

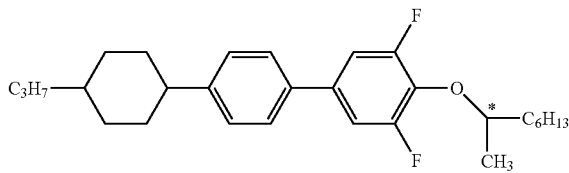

(5-5)

An antioxidant is added to the composition to prevent the resistivity from decreasing due to heating in the atmosphere, or to maintain a large voltage holding rate not only at room temperature but also at temperatures close to the upper limit temperature after the element has been used for a long time. Preferable examples of antioxidants include a compound (6) in which t is an integer of 1 to 9.

(6)

$C_tH_{2t+1}$—⬡—OH with $C(CH_3)_3$ groups

In the compound (6), t is preferably 1, 3, 5, 7, or 9. More preferably, t is 7. The compound (6) in which t is 7 has low volatility, and thus is effective in maintaining a large voltage holding rate not only at room temperature but also at temperatures close to the upper limit temperature after the element has been used for a long time. A preferable proportion of the antioxidant is about 50 ppm or more to obtain its effect, and is about 600 ppm or less so as not to lower the upper limit temperature or raise the lower limit temperature. A more preferable proportion is in a range of about 100 ppm to about 300 ppm.

Preferable examples of ultraviolet absorbers include benzophenone derivatives, benzoate derivatives, and triazole derivatives. Light stabilizers such as sterically hindered amines are also preferable. Preferable examples of light stabilizers include compounds (7-1) to (7-16). A preferable proportion of these absorbers and stabilizers is about 50 ppm or more to obtain their effects, and is about 10,000 ppm or less so as not to lower the upper limit temperature or raise the lower limit temperature. A more preferable proportion is in a range of about 100 ppm to about 10,000 ppm.

(7-1)

(7-2)

(7-3)
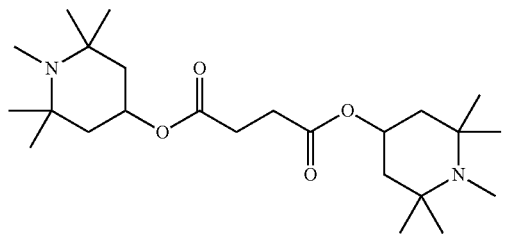
(7-4)
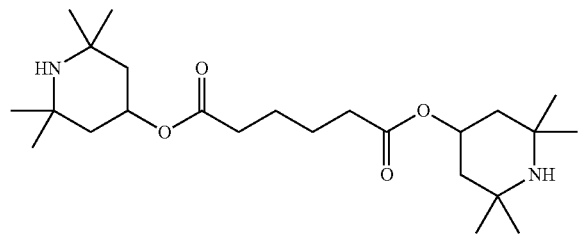
(7-5)
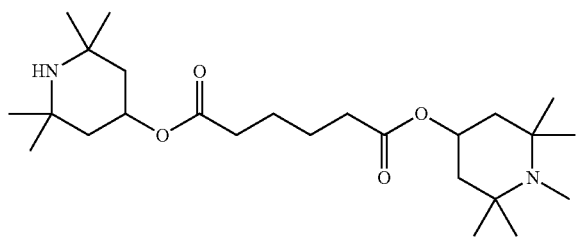
(7-6)
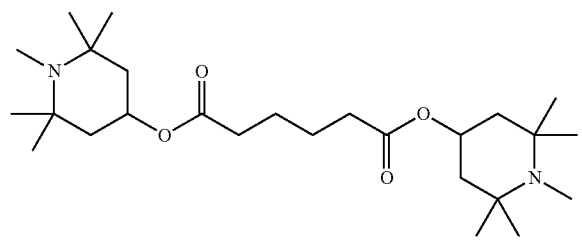
(7-7)
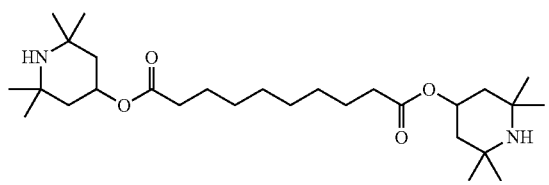
(7-8)
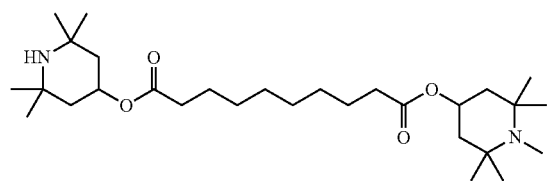
(7-9)
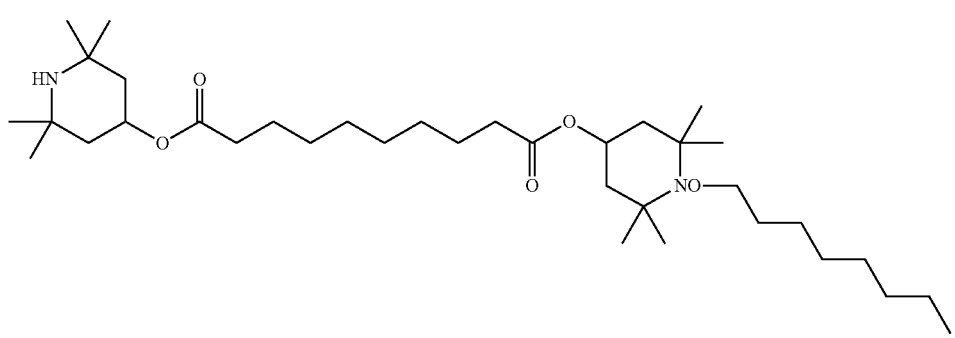
(7-10)
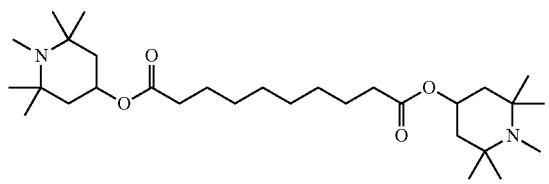
(7-11)
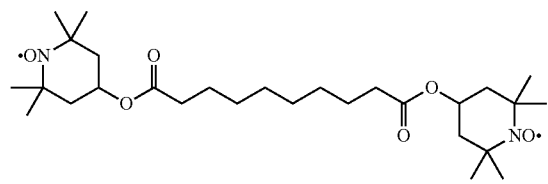

-continued (7-12)

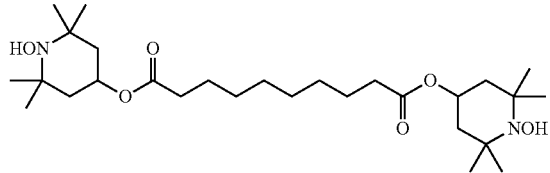

(7-13)

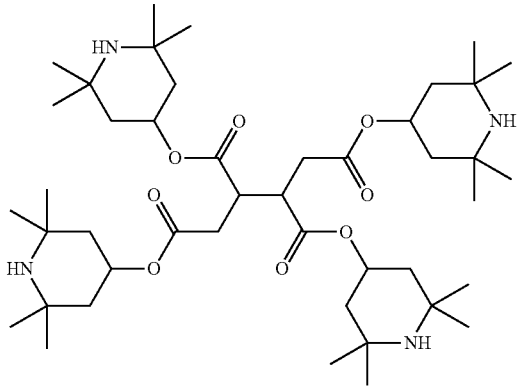

(7-14)

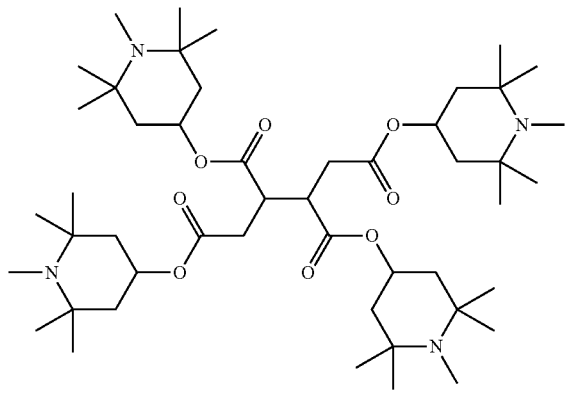

(7-15)

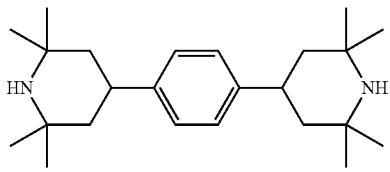

(7-16)

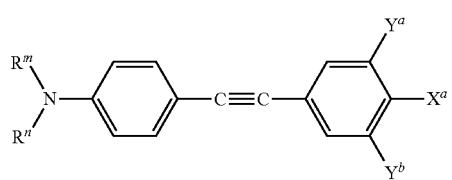

Preferable additives as a stabilizer with respect to ultraviolet rays and heat include an amino-tolan compound represented by a compound (8) (U.S. Pat. No. 6,495,066), and the like.

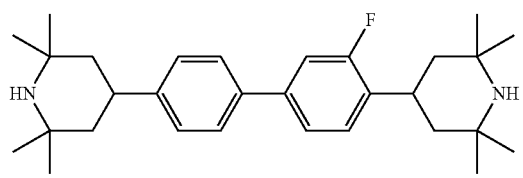

(8)

In Formula (8), $R^m$ and $R^n$ are an alkyl having 1 to 12 carbon atoms, an alkoxy having 1 to 12 carbon atoms, an alkenyl having 2 to 12 carbon atoms, or an alkenyloxy having 2 to 12 carbon atoms; $X^a$ is —$NO_2$, —C≡N, —N=C=S, fluorine, or —$OCF_3$; and $Y^a$ and $Y^b$ are hydrogen or fluorine. Preferable proportions of these stabilizers is in a range of 1% to 20% by weight to obtain their effects, and is more preferably in a range of 5% to 10% by weight.

A quencher is a compound that prevents the decomposition of a liquid crystal compound by receiving light energy absorbed by the liquid crystal compound to convert it into heat energy. A preferable proportion of these quenchers is about 50 ppm or more to obtain their effects, and is about 20,000 ppm or less to lower the lower limit temperature. A more preferable proportion is in a range of about 100 ppm to about 10,000 ppm.

Dichroic dyes such as azo dyes and anthraquinone dyes are added to the composition for conformity with an element in guest host (GH) mode. A preferable proportion of the dye is in a range of about 0.01% by weight to about 10% by weight. Antifoaming agents such as dimethyl silicone oil and methyl phenyl silicone oil are added to the composition to prevent foaming. A preferable proportion of the antifoaming agent is about 1 ppm or more to obtain its effect, and is about 1,000 ppm or less to prevent display defects. A more preferable proportion is in a range of about 1 ppm to about 500 ppm.

Polymerizable compounds are added to the composition for conformity with a polymer stabilized element. Preferable examples of polymerizable compounds include compounds having a polymerizable group such as acrylate, methacrylate, vinyl compounds, vinyloxy compounds, propenyl ether, epoxy compounds (oxirane, oxetane), and vinyl ketone. More preferable examples include derivatives of acrylate or methacrylate. A preferable proportion of the polymerizable compound is about 0.05% by weight or more to obtain the effect, and is about 20% by weight or less to prevent an increase in driving temperature. A more preferable proportion is in a range of about 0.1% by weight to about 10% by weight. The polymerizable compound is polymerized by irradiation with ultraviolet rays. The polymerization may be carried out in the presence of a polymerization initiator such as a photopolymerization initiator. Suitable conditions for polymerization, suitable types of initiators, and suitable amounts are known to those skilled in the art and are described in documents. For example, Irgacure 651 (registered trademark; BASF), Irgacure 184 (registered trademark; BASF), and Darocur 1173 (registered trademark; BASF), which are photopolymerization initiators, are suitable for radical polymerization. A preferable proportion of the photopolymerization initiator is in a range of about 0.1 parts by weight to about 5 parts by weight based on 100 parts by weight of the polymerizable compound. A more preferable proportion is in a range of about 1 part by weight to about 3 parts by weight.

When storing the polymerizable compound, a polymerization inhibitor may be added to prevent polymerization. The polymerizable compound is usually added to the composition without removing the polymerization inhibitor. Examples of polymerization inhibitors include hydroquinone, hydroquinone derivatives such as methylhydroquinone, 4-tert-butylcatechol, 4-methoxyphenol, and phenothiazine.

In the present specification, a polar compound is an organic compound having polarity, and does not include compounds having an ionic bond. Atoms such as oxygen, sulfur, and nitrogen tend to be more electronegative and partially negatively charged. Carbon and hydrogen tend to be neutral or partially positively charged. Polarity results from uneven distribution of partial charges between different types of atoms in the compound. For example, the polar compound has at least one of the following partial structures: —OH, —COOH, —SH, —NH$_2$, >NH, and >N—.

Seventh, a method for synthesizing the component compounds will be explained. A method for synthesizing the compound (1) will be described in the section of Examples. Other compounds can be synthesized by methods described in books such as Organic Syntheses, John Wiley & Sons, Inc.; Organic Reactions, John Wiley & Sons, Inc.; Comprehensive Organic Synthesis, Pergamon Press; and New Courses in Experimental Chemistry (Maruzen). The composition is prepared by known methods from the compounds obtained as above. For example, the component compounds are mixed and dissolved together by heating.

Finally, the usage of the composition will be explained. Since the composition of the present disclosure has a lower limit temperature of about −10° C. or lower and an upper limit temperature of about 70° C. or higher, it can be used not only as a composition having a nematic phase, but also as an optically active composition by adding an optically active compound.

The oriented liquid crystal composition has different dielectric constants in its perpendicular and horizontal directions. Therefore, it has dielectric constant anisotropy as a characteristic.

Elements using a liquid crystal composition, which are not limited to antenna elements, are generally consist of an element in which a liquid crystal composition as a layer is sandwiched between two substrates, and by an orientation film at the interface thereof, liquid crystal molecules are arranged (orientated) in one direction. In the absence of an external field, the liquid crystal molecules in the element are arranged in one direction due to the orientation regulating force of the orientation film. However, when an external field is applied, the liquid crystal molecules in the element are deviated from the arrangement of the orientation film and are oriented in the direction of the external field. In addition, when the external field is removed again, the liquid crystal molecules return to the original state of being arranged in one direction due to the orientation regulating force of the orientation film. In this manner, the orientation of the liquid crystal molecules in the element can be controlled by the direction and the magnitude of the external field, which makes it possible to control the inclination (angle) of the liquid crystal molecules in the element in one direction. Since the liquid crystal composition has dielectric constant anisotropy, the dielectric constant of the layer of the liquid crystal composition in the element in one direction can be controlled by controlling the angle of the liquid crystal molecules in the element in one direction. For example, the dielectric constant of the layer of the liquid crystal composition in one direction in the case of no external field is the dielectric constant in the perpendicular direction of the liquid crystal composition, and by perpendicularly applying an external field in one direction, the dielectric constant in the horizontal direction of the liquid crystal composition can also be changed.

In this manner, the liquid crystal composition of the present disclosure can be used as a switching element that can reversibly control the dielectric constant by reversibly changing the orientation direction of liquid crystal molecules.

The angle of the liquid crystal molecules in the element can be controlled using an electric field as an external field. A voltage required to drive the liquid crystal molecules is the driving voltage. To control the angle of the liquid crystal molecules, the dielectric constant anisotropy of the liquid crystal composition at 25° C. in a frequency range of less than 1 MHz is required to be at least greater than 2. To further reduce the driving voltage, it is required to increase the dielectric constant anisotropy at 25° C. in a frequency range of less than 1 MHz, and the dielectric constant anisotropy is preferably 5 or more, and more preferably 10 or more.

As mentioned above, the larger the refractive index anisotropy (Δn) in visible light (for example, wavelength 589 nm), the greater the dielectric constant anisotropy (Δε) in a high-frequency region (range from microwaves to terahertz waves (approximately 10 THz)). The refractive index anisotropy (Δn) at 25° C. of the liquid crystal composition containing the compound represented by General Formula (1) of the disclosure of the present application is preferably 0.25 or more. In particular, when used for high-frequency usages, Δn is preferably 0.35 or more, and is more preferably 0.45 or more.

To perform phase difference control in the high-frequency region, the dielectric constant anisotropy in the high-frequency region is preferably 0.5 or more. To perform phase control more suitably, it is required to increase the dielectric constant anisotropy in the high-frequency region. To perform sufficient phase control, the dielectric constant anisotropy is preferably 1.0 or more, and is more preferably 1.2 or more.

Furthermore, the composition of the present disclosure can be used in elements used for controlling electromagnetic waves in a frequency range of 1 GHz to 10 THz. Application examples include millimeter-wave variable phase shifters, light detection and ranging (LiDAR) elements, and antennas to which metamaterial technology has been applied.

Articles containing this composition can also be used for usages other than electromagnetic wave control. By reversibly changing the orientation direction of the liquid crystal molecules, it is also possible to control refractive index anisotropy in addition to dielectric constant anisotropy. Examples of application usages of these characteristic controls include liquid crystal lenses and birefringent lenses for stereoscopic image display.

EXAMPLES

The present disclosure will be explained in more detail with reference to examples. The present disclosure is not limited by these examples. The present disclosure also includes a mixture in which at least two of compositions of the examples are mixed. A synthesized compound was identified by NMR analysis. The characteristics of the composition were measured by the methods described below.

NMR analysis: DRX-500 (manufactured by Bruker BioSpin K.K.) was used as a measurement device. In $^1$H-NMR measurement, a sample was dissolved in a deuterated solvent such as $CDCl_3$, and the measurement was performed under the conditions of room temperature, 500 MHz, and 16 integrations. Tetramethylsilane was used as an internal standard. $^{19}$F-NMR measurement was performed with 24 integrations using $CFCl_3$ as an internal standard. In the description of nuclear magnetic resonance spectrum, s means singlet, d means doublet, t means triplet, q means quartet, quin means quintet, sex means sextet, m means multiplet, and br means broad.

Measurement sample: when measuring a phase structure and a transition temperature, a liquid crystal compound itself was used as a sample. When measuring physical properties such as the upper limit temperature, the viscosity, the optical anisotropy, and the dielectric constant anisotropy of the nematic phase, a composition prepared by mixing a compound with a mother liquid crystal was used as a sample.

When using a sample in which a compound was mixed with a mother liquid crystal, measurement was performed using the following method. A sample was prepared by mixing 20% by weight of the compound and 80% by weight of the mother liquid crystal. From the measurement value of this sample, an extrapolation value was calculated according to the extrapolation method expressed by the following formula, and this value was recorded.

<Extrapolation value>=(100×<measurement value of sample>−<% by weight of mother liquid crystal>×<measurement value of mother liquid crystal>)/<% by weight of compound>

Even when the proportion of the compound and the mother liquid crystal was this proportion, in the case in which crystals (or smectic phase) precipitated at 25° C., the physical properties of the sample were measured based on the ratio at which crystals (or smectic phase) stopped precipitating at 25° C. by changing the proportion of the compound and the mother liquid crystal to 10% by weight: 90% by weight, 5% by weight: 95% by weight, and 1% by weight: 99% by weight in this order. The proportion of the compound and the mother liquid crystal was 20% by weight: 80% by weight, unless otherwise specified.

As the mother liquid crystal, the following mother liquid crystal (i) was used. The proportion of the components of the mother liquid crystal (i) was expressed in % by weight.

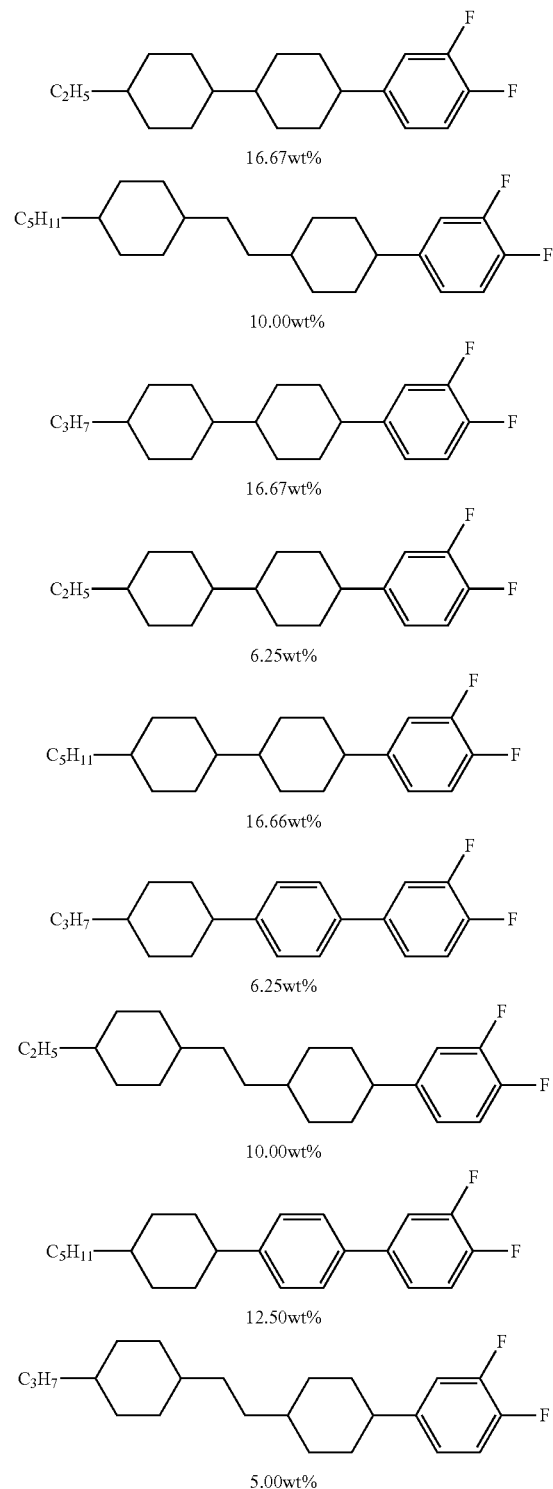

Measurement method: characteristics were measured using the following method. Many of these were the method described in the JEITA standard (JEITA ED-2521B) which is deliberated and enacted by the Japan Electronics and Information Technology Industries Association (hereinafter referred to as JEITA), or a method in which this method was modified. A thin film transistor (TFT) was not attached to a TN element used in the measurement.

Upper limit temperature of nematic phase (NI; ° C.):
The sample was placed on a hot plate of a melting point measurement device equipped with a polarized-light microscope, and was heated at a rate of 1° C./minute. A temperature at which a part of the sample changed from a nematic phase to an isotropic liquid was measured.

Lower limit temperature of nematic phase ($T_c$; ° C.):
A sample having a nematic phase was put in a glass bottle and stored in a freezer at 0° C., −10° C., −20° C., −30° C., and −40° C. for 10 days, and then a liquid crystal phase was observed. For example, when the sample remained in a nematic phase at −20° C. and but changed to a crystalline or smectic phase at −30° C., Tc was notated as <−20° C.

Viscosity (bulk viscosity; η; measured at 20° C.; mPa·s):
An E-type rotating viscometer manufactured by TOKYO KEIKI INC. was used for measurement.

Refractive index anisotropy (when Δn<0.30; measured at 25° C.):
Measurement was performed using light with a wavelength of 589 nm by an Abbe refractometer in which a polarizing plate was attached to an eyepiece.
The surface of a main prism was rubbed in one direction, and then a sample was added dropwise onto the main prism. A refractive index $n_{\parallel}$ was measured when the direction of polarization was parallel to the direction of rubbing. A refractive index $n_{\perp}$ was measured when the direction of polarization was perpendicular to the direction of rubbing.
A value of a refractive index anisotropy was calculated from the formula $\Delta n = n_{\parallel} - n_{\perp}$.

Refractive index anisotropy (when Δn≥0.30; measured at 25° C.):
A sample was put in an element composed of two glass substrates, and anti-parallel orientation was made. A thickness direction retardation (Rth) of this element was measured using a retardation film and optical material inspection device (manufactured by Otsuka Electronics Co., Ltd., trade name: RETS-100), and from a retardation value (Rth) and a distance (d: cell gap) between the glass substrates, a refractive index anisotropy (Δn) was calculated using the following formula. The wavelength of light used was 589 nm.

$Rth = \Delta n \cdot d$

Dielectric constant anisotropy (Δε; measured at 25° C.):
A sample was put in a TN element in which a distance (cell gap) between two glass substrates was 9 m and a twist angle was 80 degrees. A sine wave (10 V, 1 kHz) was applied to this element, and after 2 seconds, a dielectric constant ($\varepsilon_{\parallel}$) in a major axis direction of liquid crystal molecules was measured. A sine wave (0.5 V, 1 kHz) was applied to this element, and after 2 seconds, a dielectric constant ($\varepsilon_{\perp}$) in a minor axis direction of liquid crystal molecules was measured. A value of a dielectric constant anisotropy was calculated from the formula $\Delta \varepsilon = \varepsilon_{\parallel} - \varepsilon_{\perp}$.

Dielectric constant anisotropy at 28 GHz (measured at room temperature):
For a dielectric constant anisotropy at 28 GHz (Δε at 28 GHz), a variable short-circuit waveguide to which a window member was attached was filled with a liquid crystal, and was kept in a static magnetic field of 0.3 T for 3 minutes by the method disclosed in Applied Optics, Vol. 44, No. 7, p 1150 (2005). A microwave of 28 GHz was input to the waveguide, and an amplitude ratio of a reflected wave to an incident wave was measured. The measurement was performed while changing the direction of the static magnetic field and a tube length of the short-circuit device, and refractive indices (n: ne, no) and loss parameters (α: αe, αo) were determined. Complex dielectric constants (ε', ε") were calculated using the calculated refractive indices and loss parameters, and the following relational expressions.

$$\varepsilon' = n^2 - \kappa^2$$

$$\varepsilon'' = 2n\kappa$$

$$\alpha = 2\omega\kappa/c$$

Herein, c is the speed of light in vacuum, ω is the angular velocity, and κ is the extinction coefficient. $\varepsilon'_{\parallel}$ was calculated from $n_e$, $\varepsilon'_{\perp}$ was calculated from no, and the dielectric constant anisotropy (Δε at 28 GHz) was calculated from $\varepsilon'_{\parallel} - \varepsilon'_{\parallel}$.

Dielectric loss tangent at 28 GHz (tan δ; measured at room temperature):
The dielectric loss tangent at 28 GHz (tan δ at 28 GHz) was calculated from ε"/ε' using the complex dielectric constants (ε', ε"). A larger value was notated because anisotropy also appears in the case of tan δ.

Compound (1-3-a): synthesis of 2'-fluoro-4-isothiocyanato-3-methyl-4"-propyl-1,1':4',1"-terphenyl

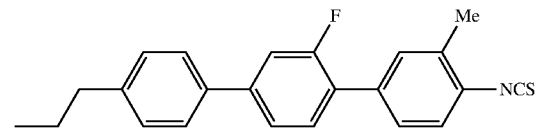

(1-3-a)

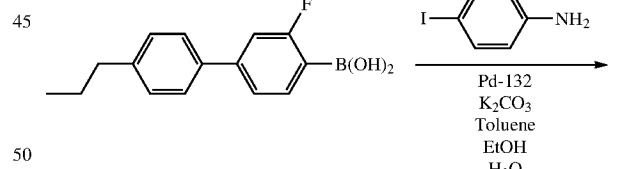

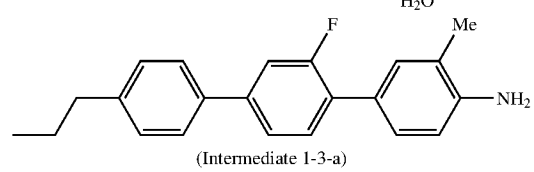

(Intermediate 1-3-a)

Under nitrogen atmosphere, Pd-132 (Johnson Matthey) (0.12 g) was added to 3-fluoro-4'-propyl-4-biphenylboronic acid (4.5 g), 4-iodo-2-methylaniline (4.0 g), potassium carbonate (4.8 g), toluene (30 mL), ethanol (10 mL), and water (10 mL), and the mixture was heated and stirred at 70° C. for 1 hour. After cooling to room temperature, water and ethyl acetate were added and stirred for a while, and thereafter the organic layer was concentrated. Purification was carried out by silica gel column chromatography (developing solution: toluene) to cause recrystallization from hot heptane, thereby obtaining an intermediate 1-3-a (4.9 g).

$^1$H-NMR (δ ppm: CDCl$_3$): 7.53 (d, 2H), 7.45 (t, 1H), 7.40 (dd, 1H), 7.35 (dd, 1H), 7.32-7.29 (m, 2H), 7.26 (d, 2H), 6.76 (d, 1H), 3.71 (br, 2H), 2.63 (t, 2H), 2.24 (s, 3H), 1.69 (sext, 2H), 0.98 (t, 3H).

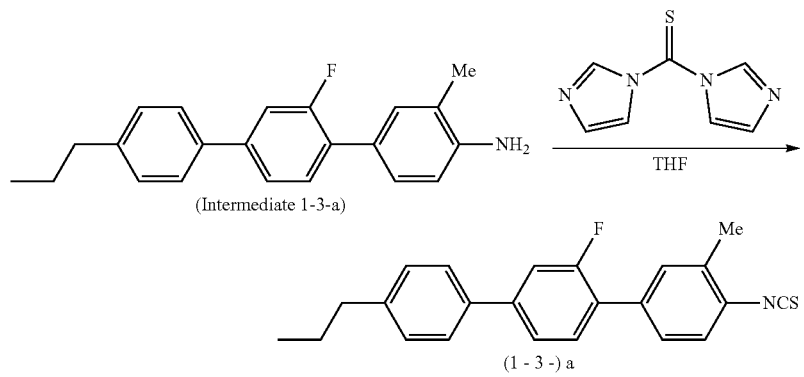

Under a nitrogen atmosphere, THF (30 mL) was added to the intermediate 1-3-a (4.9 g) and 1,1'-thiocarbonyldiimidazole (3.3 g), and the mixture was stirred at room temperature for 1 hour. The reaction solution was concentrated, and toluene:heptane=2:8 (volume ratio) was added and heated. The supernatant solution was purified by silica gel column chromatography (developing solution: toluene:heptane=2:8 (volume ratio)) to cause recrystallization from hot heptane, thereby obtaining a compound (1-3-a) (5.1 g).

$^1$H-NMR (δ ppm: CDCl$_3$): 7.53 (d, 2H), 7.46-7.36 (m, 5H), 7.28-7.25 (m, 3H), 2.64 (t, 2H), 2.44 (s, 3H), 1.69 (sext, 2H), 0.98 (t, 3H).

The physical properties of the compound (1-3-a) were as follows. $T_{NI}$=142.1° C.; Δn=0.363; Δε=18.1; η=68.8 mPa·s.

Compounds in the examples were represented by symbols based on the definitions in Table 2. The number in parentheses after the symbol corresponds to the compound number. The symbol (-) means other liquid crystal compounds. The proportion (percentage) of the liquid crystal compound is a weight percentage (% by weight) based on the weight of the liquid crystal composition. Finally, the characteristic values of the composition were summarized.

TABLE 2

| Notation of compound using symbol R—(A$_1$)—Z$_1$ ... —Z$_n$—(A$_n$)—R' | |
|---|---|
| 1) Left end group R— | Symbol |
| C$_n$H$_{2n+1}$— | n- |
| C$_n$H$_{2n+1}$O— | nO— |
| C$_m$H$_{2m+1}$OC$_n$H$_{2n}$— | mOn- |
| CH$_2$=CH— | V— |
| C$_n$H$_{2n+1}$—CH=CH— | nV— |
| CH$_2$=CH—C$_n$H$_{2n}$— | Vn- |
| C$_m$H$_{2m+1}$—CH=CH—C$_n$H$_{2n}$— | mVn- |
| C$_n$H$_{2n+1}$—C≡C— | nT— |
| 2) Right end group —R' | Symbol |
| —C$_n$H$_{2n+1}$ | -n |
| —OC$_n$H$_{2n+1}$ | —On |
| —CH=CH$_2$ | —V |
| —CH=CH—C$_n$H$_{2n+1}$ | —Vn |

TABLE 2-continued

| Notation of compound using symbol R—(A$_1$)—Z$_1$ ... —Z$_n$—(A$_n$)—R' | |
|---|---|
| —C$_n$H$_{2n}$—CH=CH$_2$ | -nV |
| —C$_n$H$_{2n}$—CH=C$_m$H$_{2m+1}$ | -nVm |

TABLE 2-continued

| Notation of compound using symbol R—(A$_1$)—Z$_1$ ... —Z$_n$—(A$_n$)—R' | |
|---|---|
| —C≡C—C$_n$H$_{2n+1}$ | —Tn |
| —F | —F |
| —Cl | —CL |
| —OCF$_3$ | —OCF3 |
| —CF$_3$ | —CF3 |
| —C≡N | —C |
| —C≡C—C≡N | —TC |
| —N=C=S | —NCS |
| —C≡C—CF$_3$ | —TCF3 |
| 3) Bonding group —Z$_n$— | Symbol |
| —C$_2$H$_4$— | 2 |
| —COO— | E |
| —CH=CH— | V |
| —C≡C— | T |
| —C≡C—C≡C— | TT |
| —CF$_2$O— | X |
| 4) Ring structure —A$_n$— | Symbol |
| [benzene ring] | B |
| [2-fluorobenzene ring] | B(2F) |
| [3-fluorobenzene ring] | B(F) |
| [3,5-difluorobenzene ring] | B(F, F) |

TABLE 2-continued

| Notation of compound using symbol R—(A₁)—Z₁ ... —Zₙ—(Aₙ)—R' | |
|---|---|
| 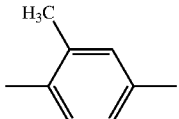 | B(2Me) |
| 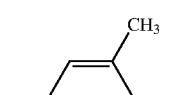 | B(Me) |
| 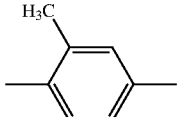 | B(2Me, 5Me) |
| 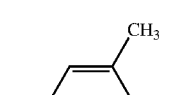 | B(Me, Me) |
| 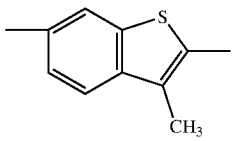 | bt(Me) |
| 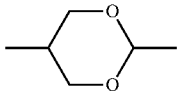 | G |

5) Notation example

Example 1  3-BB(F)B(Me, Me)—NCS

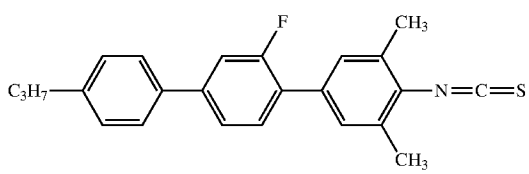

Example 2  5-BTB(F)—TC

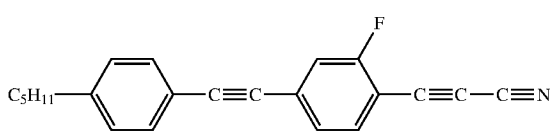

Example 3  5-BB(F)TB(Me)—NCS

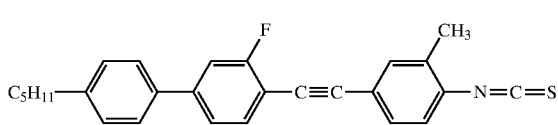

| [Comparative Example 1] Liquid crystal composition C1 | | |
|---|---|---|
| 5-B(F)TB(F)—TC | (2-1) | 10% |
| 5-BTB(F)—TC | (2-1) | 10% |
| 3-BB(F)TB—TC | (2-3) | 10% |
| 5-BB(F)TB—TC | (2-3) | 10% |
| 3-BTB (2Me)—NCS | (3-1) | 20% |
| 5-BTB(2Me)—NCS | (3-1) | 10% |
| 5-BB(F)TB(Me)—NCS | (3-4) | 10% |
| 5-BB(F)TB(2Me,5Me)—NCS | (3-4) | 10% |
| 1O—bt(Me)TB(2F)B-5 | (—) | 10% |

$NI = 146.8°\ C.;\ Tc < -20°\ C.;\ \Delta n = 0.50;\ \Delta\varepsilon = 18.9$

The dielectric constant anisotropy ($\Delta\varepsilon$ at 28 GHz) and the dielectric loss tangent (tan $\delta$ at 28 GHz) at 28 GHz of the liquid crystal composition C1 were as follows.

$\Delta\varepsilon$ at 28 GHz = 1.22 tan $\delta$ at 28 GHz = 0.010

| [Example 1] Liquid crystal composition M1 | | |
|---|---|---|
| 3-BB(F)B(2Me,5Me)—NCS | (1-3) | 10% |
| 3-BB(F)B(Me,Me)—NCS | (1-3) | 10% |
| 5-B(F)TB(F)—TC | (2-1) | 5% |
| 5-BTB(F)—TC | (2-1) | 15% |
| 3-BB(F)TB—TC | (2-3) | 10% |
| 5-BB(F)TB—TC | (2-3) | 10% |
| 3-BTB (2Me)—NCS | (3-1) | 10% |
| 3-BB(F)TB(Me)—NCS | (3-4) | 5% |
| 5-BB(F)TB(Me)—NCS | (3-4) | 10% |
| 5-BB(F)TB(2Me,5Me)—NCS | (3-4) | 10% |
| 1O—bt(Me)TB(2F)B-5 | (—) | 5% |

$NI = 146.5°\ C.;\ Tc < -20°\ C.;\ \Delta n = 0.49;\ \Delta\varepsilon = 19.3$

The dielectric constant anisotropy ($\Delta\varepsilon$ at 28 GHz) and the dielectric loss tangent (tan $\delta$ at 28 GHz) at 28 GHz of the liquid crystal composition M1 were as follows.

$\Delta\varepsilon$ at 28 GHz = 1.18 tan $\delta$ at 28 GHz = 0.007

| [Comparative Example 2] Liquid crystal composition C2 | | |
|---|---|---|
| 5-B(F)TB(F)—TC | (2-1) | 10% |
| 5-BTB(F)—TC | (2-1) | 15% |
| 3-BB(F)TB—TC | (2-3) | 10% |
| 5-BB(F)TB—TC | (2-3) | 5% |
| 3-BTB (2Me)—NCS | (3-1) | 20% |
| 5-BTB(2Me)—NCS | (3-1) | 10% |
| 3-BB(F)TB(Me)—NCS | (3-4) | 10% |

| [Comparative Example 2] Liquid crystal composition C2 | | |
|---|---|---|
| 5-BB(F)TB(Me)—NCS | (3-4) | 10% |
| 5-BB(F)TB(2Me,5Me)—NCS | (3-4) | 10% |

$NI = 131.5°\ C.; Tc < -30°\ C.; \Delta n = 0.50; \Delta\varepsilon = 21.0$

The dielectric constant anisotropy ($\Delta\varepsilon$ at 28 GHz) and the dielectric loss tangent (tan $\delta$ at 28 GHz) at 28 GHz of the liquid crystal composition C2 were as follows.

$\Delta\varepsilon$ at 28 GHz = 1.25 tan $\delta$ at 28 GHz = 0.009

| [Example 2] Liquid crystal composition M2 | | |
|---|---|---|
| 3-BB(F)B(2Me,5Me)—NCS | (1-3) | 10% |
| 3-BB(F)B(Me,Me)—NCS | (1-3) | 10% |
| 5-B(F)TB(F)—TC | (2-1) | 5% |
| 5-BTB(F)—TC | (2-1) | 15% |
| 3-BB(F)TB—TC | (2-3) | 10% |
| 5-BB(F)TB—TC | (2-3) | 10% |
| 3-BTB(2Me)—NCS | (3-1) | 20% |
| 5-BTB(2Me)—NCS | (3-1) | 10% |
| 3-BB(F)TB(Me)—NCS | (3-4) | 10% |
| 5-BB(F)TB(Me)—NCS | (3-4) | 10% |
| 5-BB(F)TB(2Me,5Me)—NCS | (3-4) | 10% |

$NI = 122.7°\ C.; Tc < -30°\ C.; \Delta n = 0.47; \Delta\varepsilon = 16.3$

The dielectric constant anisotropy ($\Delta\varepsilon$ at 28 GHz) and the dielectric loss tangent (tan $\delta$ at 28 GHz) at 28 GHz of the liquid crystal composition M2 were as follows.

$\Delta\varepsilon$ at 28 GHz = 1.20 tan $\delta$ at 28 GHz = 0.006

| [Example 3] Liquid crystal composition M3 | | |
|---|---|---|
| 3-BB(F)B(2Me,5Me)—NCS | (1-3) | 10% |
| 3-BB(F)B(Me,Me)—NCS | (1-3) | 10% |
| 5-BTB(F)—TC | (2-1) | 5% |
| 3-BB(F)TB—TC | (2-3) | 10% |
| 5-BB(F)TB—TC | (2-3) | 10% |
| 3-BTB(2Me)—NCS | (3-1) | 20% |
| 5-BTB(2Me)—NCS | (3-1) | 5% |
| 3-BB(F)TB(Me)—NCS | (3-4) | 10% |
| 5-BB(F)TB(Me)—NCS | (3-4) | 10% |
| 5-BB(F)TB(2Me,5Me)—NCS | (3-4) | 10% |

$NI = 130.2°\ C.; Tc < -30°\ C.; \Delta n = 0.48; \Delta\varepsilon = 17.6$

The dielectric constant anisotropy ($\Delta\varepsilon$ at 28 GHz) and the dielectric loss tangent (tan $\delta$ at 28 GHz) at 28 GHz of the liquid crystal composition M3 were as follows.

$\Delta\varepsilon$ at 28 GHz = 1.19 tan $\delta$ at 28 GHz = 0.007

| [Comparative Example 3] Liquid crystal composition C3 | | |
|---|---|---|
| 3-BB(F)TB—TC | (2-3) | 10% |
| 5-BB(F)TB—TC | (2-3) | 5% |
| 3-BTB(2Me)—NCS | (3-1) | 15% |
| 4-BTB(2Me)—NCS | (3-1) | 15% |
| 5-BTB(2Me)—NCS | (3-1) | 15% |
| 3-BB(F)TB(Me)—NCS | (3-4) | 5% |
| 5-BB(F)TB(Me)—NCS | (3-4) | 10% |
| 5-BB(F)TB(2Me,5Me)—NCS | (3-4) | 5% |
| 3-BTB(2Me,5F)B(F)—NCS | (3-5) | 10% |
| 3-BTB(2Me,5F)TB—NCS | (3-6) | 10% |

$NI = 118.4°\ C.; Tc < -30°\ C., \Delta n = 0.48, \Delta\varepsilon = 15.3$

The dielectric constant anisotropy ($\Delta\varepsilon$ at 28 GHz) and the dielectric loss tangent (tan $\delta$ at 28 GHz) at 28 GHz of the liquid crystal composition C3 were as follows.

$\Delta\varepsilon$ at 28 GHz = 128 tan $\delta$ at 28 GHz = 0.009

| [Example 4] Liquid crystal composition M4 | | |
|---|---|---|
| 3-BB(F)B(Me)—NCS | (1-3) | 10% |
| 3-BB(F)TB—TC | (2-3) | 10% |
| 5-BB(F)TB—TC | (2-3) | 5% |
| 3-BTB(2Me)—NCS | (3-1) | 15% |
| 4-BTB(2Me)—NCS | (3-1) | 10% |
| 5-BTB(2Me)—NCS | (3-1) | 10% |
| 3-BB(F)B(F,F)—NCS | (3-3) | 5% |
| 5-BB(F)TB(Me)—NCS | (3-4) | 10% |
| 3-BTB(2Me,5F)B(F)—NCS | (3-5) | 15% |
| 3-BTB(2Me,5F)TB—NCS | (3-6) | 10% |

$NI = 134.5°\ C.; Tc < -30°\ C.; \Delta n = 0.49; \Delta\varepsilon = 17.0$

The dielectric constant anisotropy ($\Delta\varepsilon$ at 28 GHz) and the dielectric loss tangent (tan $\delta$ at 28 GHz) at 28 GHz of the liquid crystal composition M4 were as follows.

$\Delta\varepsilon$ at 28 GHz = 1.29 tan $\delta$ at 28 GHz = 0.007

| [Example 5] Liquid crystal composition M5 | | |
|---|---|---|
| 3-BB(F)B(Me)—NCS | (1-3) | 10% |
| 3-BB(F)TB—TC | (2-3) | 10% |
| 5-BB(F)TB—TC | (2-3) | 5% |
| 3-BTB(2Me)—NCS | (3-1) | 15% |
| 3-BB(F)B(F,F)—NCS | (3-3) | 5% |
| 5-BB(F)TB(Me)—NCS | (3-4) | 15% |
| 5-BB(F)TB(2Me,5F)—NCS | (3-4) | 10% |
| 3-BTB(2Me,5F)B(F)—NCS | (3-5) | 15% |
| 3-BTB(2Me,5F)TB—NCS | (3-6) | 15% |

$NI = 178.8°$ C.; $Tc < -20°$ C.; $\Delta n = 0.53$; $\Delta\varepsilon = 15.8$

The dielectric constant anisotropy ($\Delta\varepsilon$ at 28 GHz) and the dielectric loss tangent (tan $\delta$ at 28 GHz) at 28 GHz of the liquid crystal composition M5 were as follows.

$\Delta\varepsilon$ at 28 GHz = 1.33 tan $\delta$ at 28 GHz = 0.007

| [Example 6] Liquid crystal composition M6 | | |
|---|---|---|
| 3-BB(F)B(Me)—NCS | (1-3) | 10% |
| 3-BB(F)TB—TC | (2-3) | 3% |
| 5-BB(F)TB—TC | (2-3) | 10% |
| 3-BTB(2Me)—NCS | (3-1) | 15% |
| 4-BTB(2Me)—NCS | (3-1) | 7% |
| 5-BTB(2Me)—NCS | (3-1) | 10% |
| 2-HBB(F,F)—NCS | (3-2) | 2% |
| 3-HBB(F,F)—NCS | (3-2) | 5% |
| 4-HBB(F,F)—NCS | (3-2) | 3% |
| 3-BB(F)B(F,F)—NCS | (3-3) | 5% |
| 5-BB(F)TB(2Me,5F)—NCS | (3-4) | 5% |
| 3-BTB(2Me,5F)B(F)—NCS | (3-5) | 15% |
| 3-BTB(2Me,5F)TB—NCS | (3-6) | 10% |

$NI = 138.3°$ C.; $Tc < -30°$ C.; $\Delta n = 0.48$; $\Delta\varepsilon = 17.0$

The dielectric constant anisotropy ($\Delta\varepsilon$ at 28 GHz) and the dielectric loss tangent (tan $\delta$ at 28 GHz) at 28 GHz of the liquid crystal composition M6 were as follows.

$\Delta\varepsilon$ at 28 GHz = 1.23 tan $\delta$ at 28 GHz = 0.006

| [Example 7] Liquid crystal composition M7 | | |
|---|---|---|
| 3-BB(F)B(Me)—NCS | (1-3) | 10% |
| 3-BB(F)TB—TC | (2-3) | 5% |
| 5-BB(F)TB—TC | (2-3) | 10% |
| 3-BTB(2Me)—NCS | (3-1) | 15% |
| 4-BTB(2Me)—NCS | (3-1) | 5% |
| 5-BTB (2Me)—NCS | (3-1) | 5% |
| 2-HBB(F,F)—NCS | (3-2) | 5% |
| 3-BB(F)B(F,F)—NCS | (3-3) | 5% |
| 5-BB(F)TB(2Me,5F)—NCS | (3-4) | 10% |
| 3-BTB(2Me,5F)B(F)—NCS | (3-5) | 15% |
| 3-BTB(2Me,5F)TB—NCS | (3-6) | 15% |

$NI = 157.4°$ C.; $Tc < -20°$ C.; $\Delta n = 0.51$; $\Delta\varepsilon = 17.0$

The dielectric constant anisotropy ($\Delta\varepsilon$ at 28 GHz) and the dielectric loss tangent (tan $\delta$ at 28 GHz) at 28 GHz of the liquid crystal composition M7 were as follows.

$\Delta\varepsilon$ at 28 GHz = 1.30 tan $\delta$ at 28 GHz = 0.007

| [Example 8] Liquid crystal composition M8 | | |
|---|---|---|
| 3-BB(F)B(Me)—NCS | (1-3) | 10% |
| 3-BTB(2Me)—NCS | (3-1) | 15% |
| 4-BTB(2Me)—NCS | (3-1) | 10% |
| 5-BTB(2Me)—NCS | (3-1) | 10% |
| 3-BB(F)B(F,F)—NCS | (3-3) | 5% |
| 3-BB(F)TB(Me)—NCS | (3-4) | 5% |
| 5-BB(F)TB(Me)—NCS | (3-4) | 10% |
| 5-BB(F)TB(2Me,5Me)—NCS | (3-4) | 5% |
| 3-BB(F)TB(2Me,5F)—NCS | (3-4) | 10% |
| 3-BTB(2Me,5F)B(F)—NCS | (3-5) | 10% |
| 3-BTB(2Me,5F)TB—NCS | (3-6) | 10% |

$NI = 110.4°$ C.; $Tc < -30°$ C.; $\Delta n = 0.47$; $\Delta\varepsilon = 15.1$

The dielectric constant anisotropy ($\Delta\varepsilon$ at 28 GHz) and the dielectric loss tangent (tan $\delta$ at 28 GHz) at 28 GHz of the liquid crystal composition M8 were as follows.

$\Delta\varepsilon$ at 28 GHz = 1.26 tan $\delta$ at 28 GHz = 0.007

Example 1 corresponds to a composition in which the compound represented by Formula (3-1) in Comparative Example 1 was changed to the compound represented by Formula (1-3). Herein, $\Delta\varepsilon$ at 28 GHz of the composition of Comparative Example 1 was 1.22, and $\Delta\varepsilon$ at 28 GHz of the composition of Example 1 was 1.18, both of which can be said to be large. On the other hand, tan $\delta$ at 28 GHz was each 0.010 and 0.007, meaning that the composition of Example 1 was significantly smaller. Based on this, it was confirmed that the compound (1) had the effect of reducing tan $\delta$ at 28 GHz.

The compositions of Comparative Example 1 and Comparative Example 2 had $\Delta\varepsilon$ at 28 GHz of 1.22 and 1.25, and had tan $\delta$ at 28 GHz of 0.010 and 0.009. Meanwhile, the compositions of Examples 1 to 3 had $\Delta\varepsilon$ at 28 GHz of 1.18 to 1.20, and had tan $\delta$ at 28 GHz of 0.006 to 0.007. The values of tan $\delta$ at 28 GHz of Examples 1 to 3 were smaller than the values of Comparative Examples 1 and 2, respectively.

Example 4 corresponds to a composition in which the compound represented by Formula (3) in Comparative Example 3 was changed to the compound represented by Formula (1-3). Herein, Δε at 28 GHz of the composition of Comparative Example 3 was 1.28, and Δε at 28 GHz of the composition of Example 4 was 1.29, both of which can be said to be large. On the other hand, tan δ at 28 GHz was each 0.009 and 0.007, meaning that the composition of Example 4 was significantly smaller. Based on this, it was confirmed that the compound (1) had the effect of reducing tan δ at 28 GHz.

Each of the compositions of Examples 1 to 8 contained the compound (1). The more such a compound was contained as the constituent component of the composition, the greater the dielectric constant anisotropy at high frequencies became. In addition, the value of tan δ at 28 GHz became particularly smaller.

The liquid crystal composition using the compound (1) maintained the basic performance as a liquid crystal composition and was also able to reduce the value of tan δ at 28 GHz while maintaining a large value of Δε at 28 GHz.

The liquid crystal composition is required to have the following characteristics: a dielectric constant anisotropy (Δε) that enables large phase control is large in a frequency region used for phase control; and a dielectric loss tangent (tan δ) that is proportional to the absorbed energy of electromagnetic wave signals of the liquid crystal composition is small. The results of the examples and the comparative examples proved that the composition of the present disclosure had a large dielectric constant anisotropy (Δε at 28 GHz) and a small dielectric loss tangent (tan δ at 28 GHz). Generally, the smaller tan δ, the lower the absorbed energy of electromagnetic waves. Therefore, the liquid crystal composition using the compound represented by Formula (1) can lower the absorbed energy of electromagnetic wave signals, and can set the loss of electromagnetic wave signals to be smaller. From the above description, it can be concluded that the liquid crystal composition of the present disclosure can transmit electromagnetic wave signals more efficiently.

The liquid crystal composition of the present disclosure can satisfy high-frequency characteristics of the composition, such as a large refractive index anisotropy in a frequency region for performing electromagnetic wave signal control and a small dielectric loss tangent (tan δ), while having a high upper limit temperature of a nematic phase and a low lower limit temperature of a nematic phase. Furthermore, it becomes possible to provide a more preferable liquid crystal composition by satisfying at least one of characteristics of the composition, such as a large dielectric constant anisotropy at low frequencies for reduction of a driving voltage, a small viscosity, a large resistivity in a driving frequency region, and heat stability. The element containing this composition can be used to control electromagnetic wave signals in a frequency range of 1 GHz to 10 THz.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A liquid crystal composition, comprising at least one compound selected from the group of compounds represented by Formulas (1-1) to (1-4), (1-6) and (1-8),

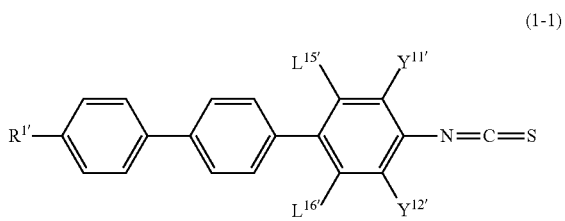

(1-1)

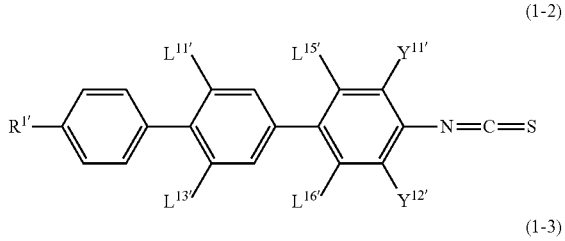

(1-2)

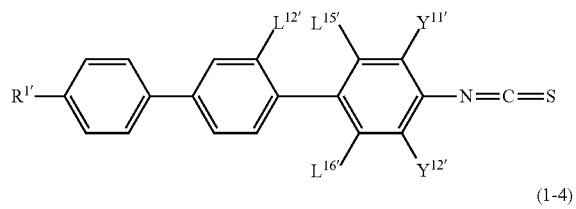

(1-3)

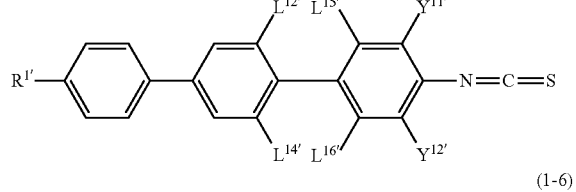

(1-4)

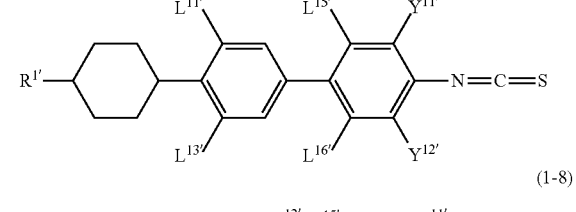

(1-6)

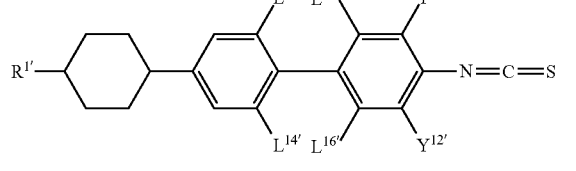

(1-8)

in Formulas (1-1) to (1-4), (1-6) and (1-8),

R$^{1'}$ is an alkyl having 1 to 12 carbon atoms, provided that in this alkyl, at least one —(CH$_2$)$_2$— may be substituted with —CH=CH— or —C≡C—;

L$^{15'}$ and L$^{16'}$ are each hydrogen, fluorine, chlorine, methyl, ethyl, or cyclopropyl;

Y$^{11'}$ and Y$^{12'}$ are each hydrogen, fluorine, chlorine, methyl, or ethyl; and at least one of L$^{15'}$, L$^{16'}$, Y$^{11'}$, and Y$^{12'}$ is methyl or ethyl, in Formulas (1-2) and (1-6), $L^{11'}$ and $L^{13'}$ are each fluorine, chlorine, methyl, ethyl, or cyclopropyl in Formulas (1-3), $L^{12'}$ is fluorine, chlorine, methyl, ethyl, or cyclopropyl, in Formulas (1-4) and (1-8), $L^{12'}$ and $L^{14'}$ are each fluorine, chlorine, methyl, ethyl, or cyclopropyl, and in Formulas (1-1), at least two of $L^{15'}$, $L^{16'}$, $Y^{11'}$, and $Y^{12'}$ are not hydrogen.

2. The liquid crystal composition according to claim 1, wherein a proportion of the compound represented by Formula (1) is in a range of 5% by weight to 40% by weight based on a weight of the liquid crystal composition.

3. The liquid crystal composition according to claim 1, comprising at least one compound selected from compounds represented by Formula (2),

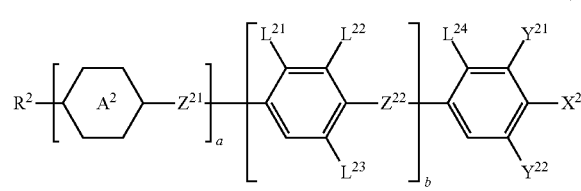

(2)

in Formula (2), $R^2$ is hydrogen, a halogen, or an alkyl having 1 to 12 carbon atoms, provided that in this alkyl, at least one —$CH_2$— may be substituted with —O— or —S—, and at least one —$(CH_2)_2$— may be substituted with —CH=CH— or —C≡C—, and at least one hydrogen may be substituted with a halogen;

ring $A^2$ is 1,4-cyclohexylene, 1,4-cyclohexenylene, tetrahydropyran-2,5-diyl, 1,3-dioxane-2,5-diyl, pyrimidine-2,5-diyl, 2,6,7-trioxabicyclo [2.2.2]octane -1,4-diyl, naphthalene -2,6-diyl, or pyridine-2,5-diyl, provided that at least one hydrogen on these rings may be substituted with a halogen or an alkyl having 1 to 3 carbon atoms;

$Z^{21}$ and $Z^{22}$ are each a single bond, —C≡C—, or —C≡C—C≡C—;

$L^{21}$, $L^{22}$, $L^{23}$, and $L^{24}$ are each hydrogen, a halogen, an alkyl having 1 to 3 carbon atoms, or a cycloalkyl having 3 to 5 carbon atoms;

$X^2$ is —C≡C—$CF_3$ or —C≡C—C≡N;

$Y^{21}$ and $Y^{22}$ are each hydrogen, a halogen, or an alkyl having 1 to 3 carbon atoms; and a is 0 or 1, and b is 1, 2, or 3, provided that a sum of a and b is 1 or more and 3 or less.

4. The liquid crystal composition according to claim 3, wherein the liquid crystal composition contains at least one compound selected from the group of compounds represented by Formulas (2-1) to (2-8) as the compound represented by Formula (2),

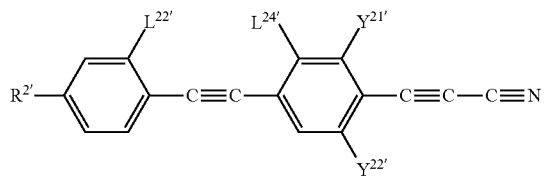
(2-1)

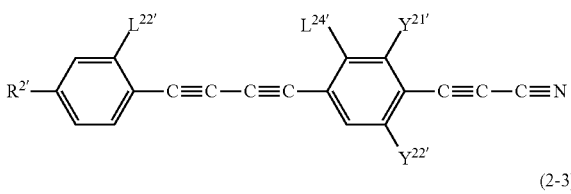
(2-2)

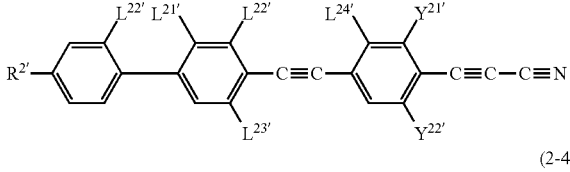
(2-3)

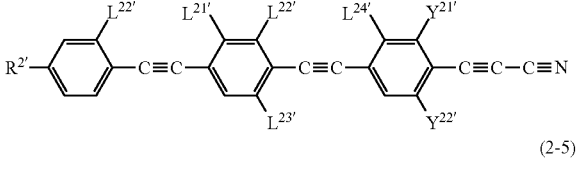
(2-4)

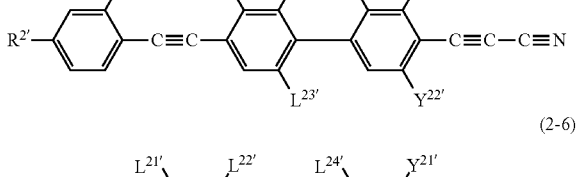
(2-5)

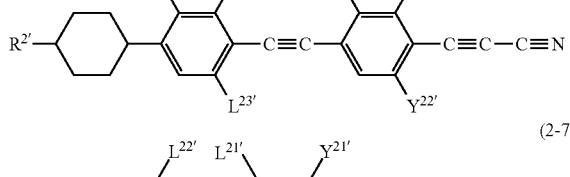
(2-6)

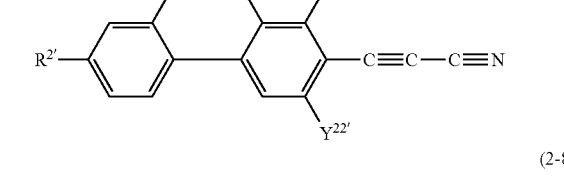
(2-7)

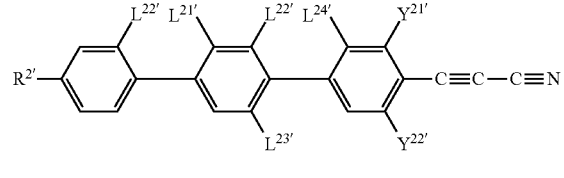
(2-8)

in Formulas (2-1) to (2-8), $R^{2'}$ is an alkyl having 1 to 12 carbon atoms, provided that in this alkyl, at least one—$(CH_2)_2$— may be substituted with —CH=CH— or —C≡C—;

$L^{22'}$ is hydrogen, fluorine, chlorine, methyl, ethyl, or cyclopropyl; and $Y^{21'}$ and $Y^{22'}$ are each hydrogen, fluorine, chlorine, methyl, or ethyl, in Formulas (2-1) and (2-2), $L^{24'}$ is hydrogen, fluorine, chlorine, methyl, ethyl, or cyclopropyl, in Formulas (2-3) to (2-6), and Formula (2-8), $L^{21'}$, $L^{23'}$, and $L^{24'}$ are each hydrogen, fluorine, chlorine, methyl, ethyl, or cyclopropyl, and in Formula (2-7), $L^{21'}$ is hydrogen, fluorine, chlorine, methyl, ethyl, or cyclopropyl.

5. The liquid crystal composition according to claim 3, wherein a proportion of the compound represented by Formula (2) is in a range of 5% by weight to 50% by weight based on a weight of the liquid crystal composition.

6. The liquid crystal composition according to claim 1, comprising at least one compound selected from compounds represented by Formula (3),

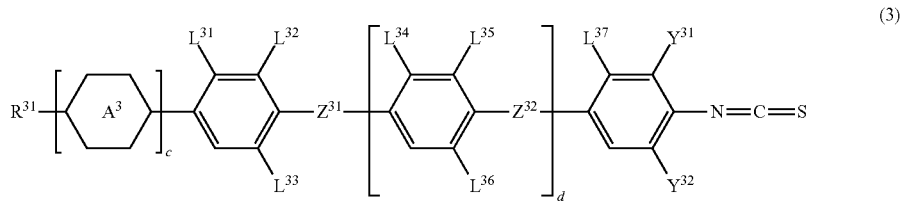

(3)

in Formula (3), $R^{31}$ is hydrogen, a halogen, or an alkyl having 1 to 12 carbon atoms, provided that in this alkyl, at least one —$CH_2$— may be substituted with —O— or —S—, and at least one —$(CH_2)_2$— may be substituted with —CH=CH— or —C≡C—, and at least one hydrogen may be substituted with a halogen;

ring $A^3$ is 1,4-cyclohexylene, 1,4-cyclohexenylene, tetrahydropyran-2,5-diyl, 1,3-dioxane-2,5-diyl, pyrimidine-2,5-diyl, 2,6,7-trioxabicyclo [2.2.2]octane-1,4-diyl, naphthalene -2,6-diyl, or pyridine-2,5-diyl, provided that at least one hydrogen on these rings may be substituted with a halogen or an alkyl having 1 to 3 carbon atoms;

$Z^{31}$ and $Z^{32}$ are each a single bond, —CH=CH—, —CF=CF—, —C≡C—, or —C≡C—C≡C—;

$L^{31}$, $L^{32}$, $L^{33}$, $L^{34}$, $L^{35}$, $L^{36}$, and $L^{37}$ are each hydrogen, a halogen, an alkyl having 1 to 3 carbon atoms, or a cycloalkyl having 3 to 5 carbon atoms;

$Y^{31}$ and $Y^{32}$ are each hydrogen, a halogen, or an alkyl having 1 to 3 carbon atoms; and c is 0 or 1, d is 0, 1, or 2, and a sum of c and d is 0 or more and 2 or less, provided that when a sum of c and d is 1, and $Z^{31}$ and $Z^{32}$ are each a single bond, $L^{31}$, $L^{32}$, $L^{33}$, $L^{34}$, $L^{35}$, $L^{36}$, $L^{37}$, $Y^{31}$, and $Y^{32}$ are each not an alkyl having 1 to 3 carbon atoms.

7. The liquid crystal composition according to claim 6, wherein the at least one compound selected from the compounds represented by Formula (3) includes a compound in which $Y^{31}$ and $Y^{32}$ are both fluorine.

8. The liquid crystal composition according to claim 6, wherein the liquid crystal composition contains at least one compound selected from the group of compounds represented by Formulas (3-1) to (3-8) as the compound represented by Formula (3),

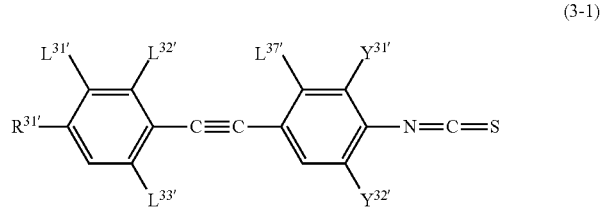

(3-1)

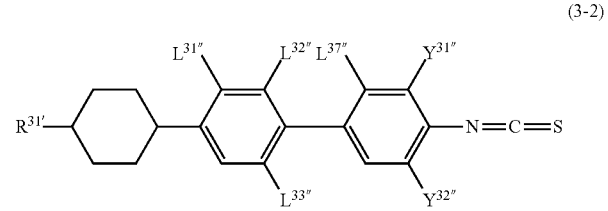

(3-2)

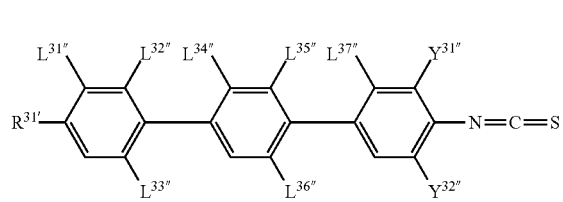

(3-3)

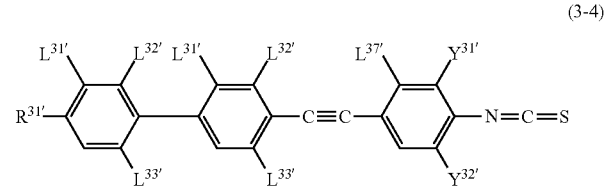

(3-4)

-continued (3-5)
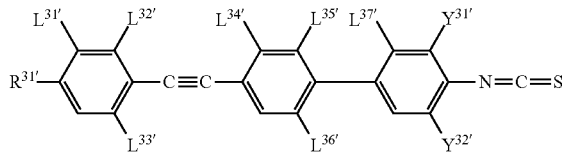

(3-6)
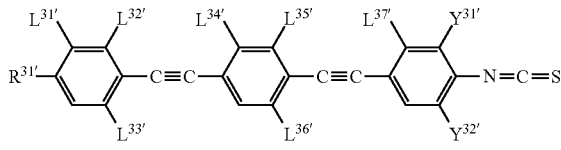

(3-7)
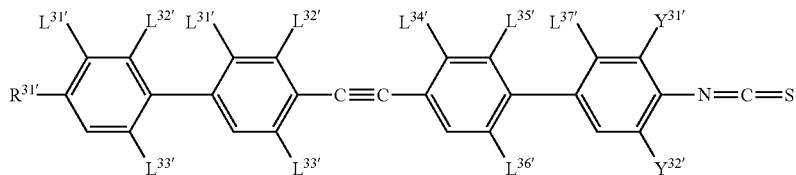

(3-8)
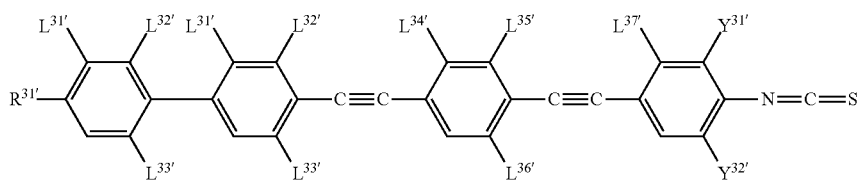

in Formula (3-1), and Formulas (3-4) to (3-8), $R^{31'}$ is an alkyl having 1 to 12 carbon atoms, provided that in this alkyl, at least one —$(CH_2)_2$— may be substituted with —CH=CH— or —C≡C—;

$L^{31'}$, $L^{32'}$, $L^{33'}$, and $L^{37'}$ are each hydrogen, fluorine, chlorine, methyl, ethyl, or cyclopropyl; and $Y^{31'}$ and $Y^{32'}$ are each hydrogen, fluorine, chlorine, methyl, or ethyl, in Formulas (3-5), (3-7), and (3-8), $L^{34'}$, $L^{35'}$, and $L^{36'}$ are each hydrogen, fluorine, chlorine, methyl, ethyl, or cyclopropyl, in Formulas (3-2) and (3-3), $R^{31''}$ is an alkyl having 1 to 12 carbon atoms, provided that in this alkyl, at least one —$(CH_2)_2$— may be substituted with —CH=CH— or —C≡C—;

$L^{31''}$, $L^{32''}$, $L^{33''}$, and $L^{37''}$ are each hydrogen, fluorine, chlorine, or cyclopropyl; and $Y^{31''}$ and $Y^{32''}$ are each hydrogen, fluorine, or chlorine, and in Formula (3-3), $L^{34''}$, $L^{35''}$, and $L^{36''}$ are each hydrogen, fluorine, chlorine, or cyclopropyl.

9. The liquid crystal composition according to claim 6, wherein a proportion of the compound represented by Formula (3) is in a range of 30% by weight to 90% by weight based on a weight of the liquid crystal composition.

10. The liquid crystal composition according to claim 1, wherein a refractive index anisotropy at 25° C. at a wavelength of 589 nm is 0.35 or more.

11. The liquid crystal composition according to claim 1, wherein a dielectric constant anisotropy at 25°° C. in a frequency range of less than 1 MHz is 5 or more.

12. The liquid crystal composition according to claim 1, wherein a dielectric constant anisotropy at 25° C. in at least one frequency range of 1 GHz to 10 THz is in a range of 0.50 to 3.0.

13. The liquid crystal composition according to claim 1, comprising an optically active compound.

14. The liquid crystal composition according to claim 1, comprising a polymerizable compound.

15. The liquid crystal composition according to claim 1, comprising at least one of an antioxidant, an ultraviolet absorber, an antistatic agent, and a dichroic dye.

16. An element, which is used for switching and in which a dielectric constant can be reversibly controlled by reversibly changing an orientation direction of liquid crystal molecules, the element comprising the liquid crystal composition according to claim 1.

17. An element, which is used for controlling electromagnetic waves in a frequency range of 1 GHz to 10 THz, the element comprising the liquid crystal composition according to claim 1.

18. A liquid crystal lens or a birefringent lens for stereoscopic image display, comprising the liquid crystal composition according to claim 1.

* * * * *